(12) United States Patent
Manabe

(10) Patent No.: US 10,686,960 B2
(45) Date of Patent: Jun. 16, 2020

(54) IMAGE FORMING APPARATUS AND PROGRAM FOR DETERMINING AN OUTPUT MODE

(71) Applicant: Konica Minolta, Inc., Chiyoda-ku, Tokyo (JP)

(72) Inventor: Kenji Manabe, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/294,420

(22) Filed: Mar. 6, 2019

(65) Prior Publication Data
US 2019/0312991 A1 Oct. 10, 2019

(30) Foreign Application Priority Data
Apr. 9, 2018 (JP) .................................. 2018-074697

(51) Int. Cl.
*H04N 1/23* (2006.01)
*G06F 3/03* (2006.01)
*G06F 3/12* (2006.01)

(52) U.S. Cl.
CPC ............ *H04N 1/2353* (2013.01); *G06F 3/03* (2013.01); *G06F 3/1259* (2013.01); *G06F 3/1273* (2013.01); *H04N 1/2338* (2013.01); *H04N 1/2369* (2013.01)

(58) Field of Classification Search
CPC .................................................. H04N 1/2353
USPC ........................................................ 358/1.15
See application file for complete search history.

(56) References Cited

U.S. PATENT DOCUMENTS

| | | | | |
|---|---|---|---|---|
| 2007/0019224 A1* | 1/2007 | Okada | .................... | G06F 3/1208 358/1.13 |
| 2007/0052992 A1* | 3/2007 | Yamada | ................. | G06F 3/1205 358/1.13 |
| 2007/0213870 A1* | 9/2007 | Roberts | ................... | B65H 33/04 700/219 |
| 2014/0132976 A1* | 5/2014 | Csurka | ................... | G06F 3/1219 358/1.14 |
| 2016/0253137 A1* | 9/2016 | Nakao | .................... | G06F 3/1238 358/1.14 |
| 2018/0004463 A1* | 1/2018 | Masumoto | ............. | G06F 3/1204 |

FOREIGN PATENT DOCUMENTS

JP 2013-010194 2/2013

* cited by examiner

*Primary Examiner* — Jacky X Zheng
(74) *Attorney, Agent, or Firm* — BakerHostetler

(57) ABSTRACT

The present disclosure pertains to an image forming apparatus that may include a hardware processor that may: receive a print job; acquire position information of a user; determine an output mode of a printed matter on the basis of the acquired position information; and execute the print job and output the printed matter in the determined output mode.

17 Claims, 31 Drawing Sheets

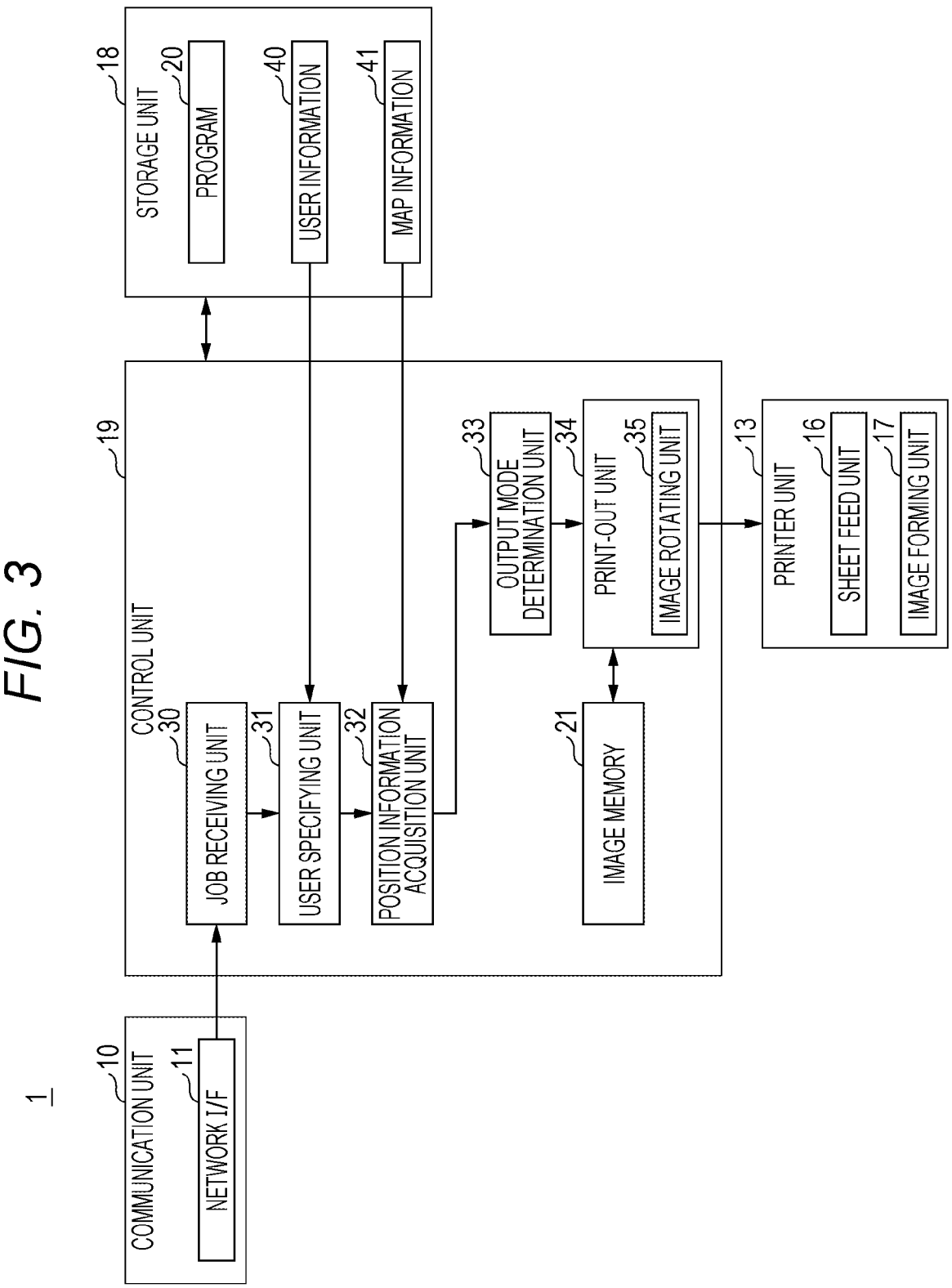

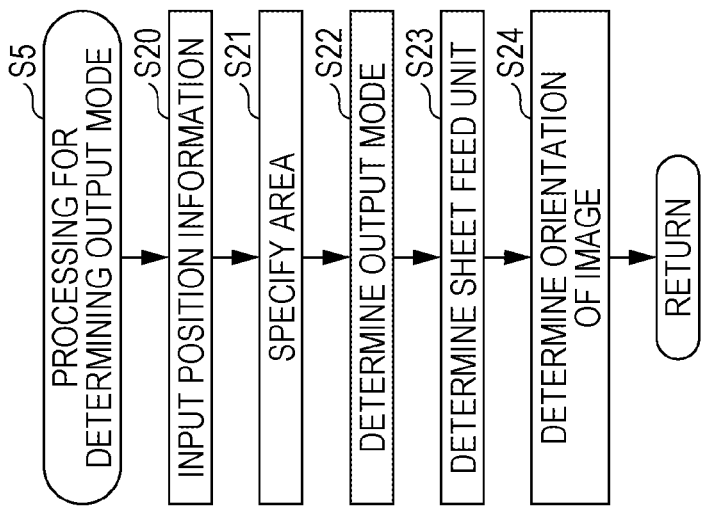
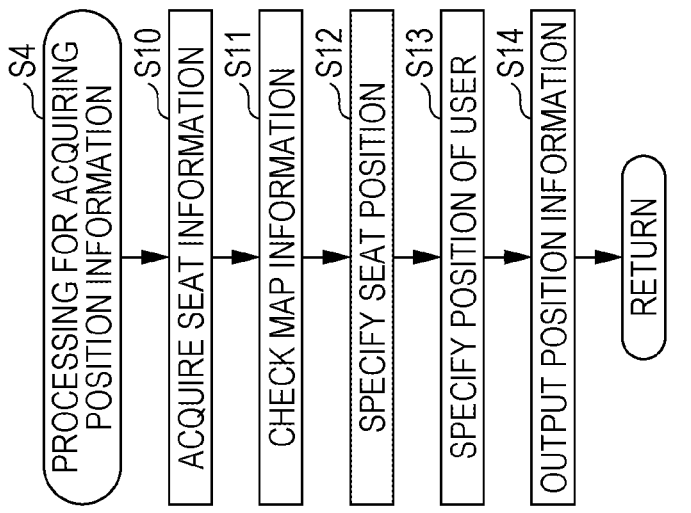
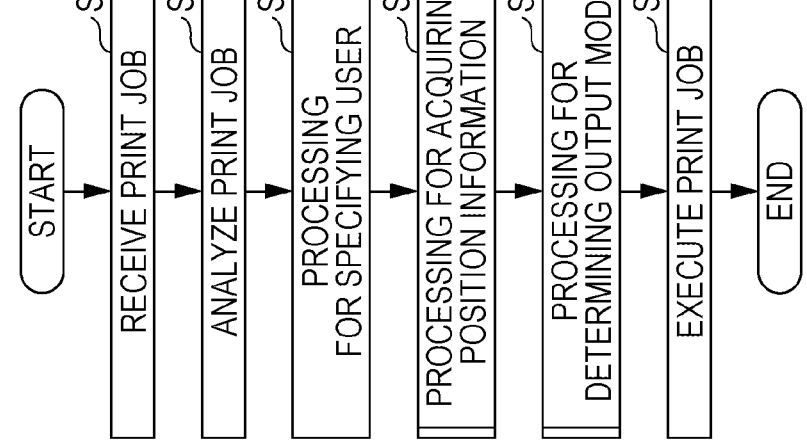

| GROUP TO WHICH USER BELONGS | MEMBERS BELONGING TO GROUP |
|---|---|
| GROUP G1 | USER A |
|  | USER B |
|  | USER C |
|  | USER D |
| GROUP G2 | USER A |
|  | USER M |
|  | USER N |

IMAGE FORMING APPARATUS AND PROGRAM FOR DETERMINING AN OUTPUT MODE

CROSS REFERENCE TO RELATED APPLICATIONS

This application claims priority to Japanese patent Application No. 2018-074697, filed on Apr. 9, 2018, which is incorporated herein by reference in its entirety.

Background. Technological Field

The present disclosure relates to an image forming apparatus and a program, and more particularly, to an image forming technique that can change the output mode of a printed matter.

Discussion of Technical Background

An image forming apparatus, such as multifunction peripherals (MFPs), which makes a printed matter likely to be easily and simultaneously referred to by two users facing each other while suppressing the waste of printing sheets, has been known in the related art (for example, JP 2013-010194 A). According to this technique in the related art, a printed matter where an image is disposed in one area on a printing sheet as it is and an image rotated by 180° is disposed in the other area is output. Accordingly, a printed matter likely to be easily and simultaneously referred to by two users facing each other is output.

Incidentally, a technique, such as a remote panel, of the image forming apparatus, such as multifunction peripherals (MFPs), has been developed in recent years. The remote panel is a technique that displays an operating screen, which is used to operate the image forming apparatus, on a portable terminal, such as a smartphone possessed by a user and receives operation information based on the user's operation through the portable terminal. For this reason, a user can input a print job to the image forming apparatus by instructing the image forming apparatus to operate using one's own portable terminal. As the remote panel is spread, machines where a user operates an operation panel provided on an image forming apparatus decrease.

Accordingly, it is thought that the removal of panels of image forming apparatuses will progress in the future. When the removal of panels of image forming apparatuses will progress, the concept of directionality, such as the front and back of the image forming apparatus, disappears. For this reason, it is thought that a form where an image forming apparatus shared by a plurality of users is installed at the center or the like of an office will increase as the installation form of an image forming apparatus in the future.

In a case where the above-mentioned image forming apparatus is installed at the center of an office, users, which are to acquire printed matters, move to the image forming apparatus in various directions around the image forming apparatus. If the image forming apparatus always outputs printed matters with a constant orientation in such a case, user's printed matters with an inverse orientation are output in the case of a certain direction where a user approaches the image forming apparatus. For this reason, a situation where a user cannot grasp one's own printed matters at a glance may occur.

To prevent such a situation, it is desired that the image forming apparatus outputs printed matters with an orientation corresponding to a direction where a user approaches. However, since printed matters with an orientation corresponding to a direction where a user approaches to acquire printed matters are not output in the above-mentioned technique in the related art, the above-mentioned problem cannot be solved.

SUMMARY

The present disclosure may address one or more of the above-mentioned problems, and an object of the present disclosure may be to provide an image forming apparatus and a program that can output a printed matter in the front direction of a user at the time of acquisition of a printed matter by appropriately changing the output mode of the printed matter on the basis of the position and the like of the user inputting a print job.

To achieve the abovementioned object, according to an aspect of the present disclosure, an image forming apparatus reflecting one aspect of the present disclosure comprises a hardware processor that: receives a print job; acquires position information of a user; determines an output mode of a printed matter on the basis of the acquired position information; and executes the print job and outputs the printed matter in the determined output mode.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 3 is a diagram illustrating an example of hardware components and functional components of the image forming apparatus of the first embodiment;

FIGS. 5A to 5C are flowcharts illustrating examples of the procedures of processing performed in the image forming apparatus of the first embodiment;

DETAILED DESCRIPTION OF EMBODIMENTS

Figure 1:
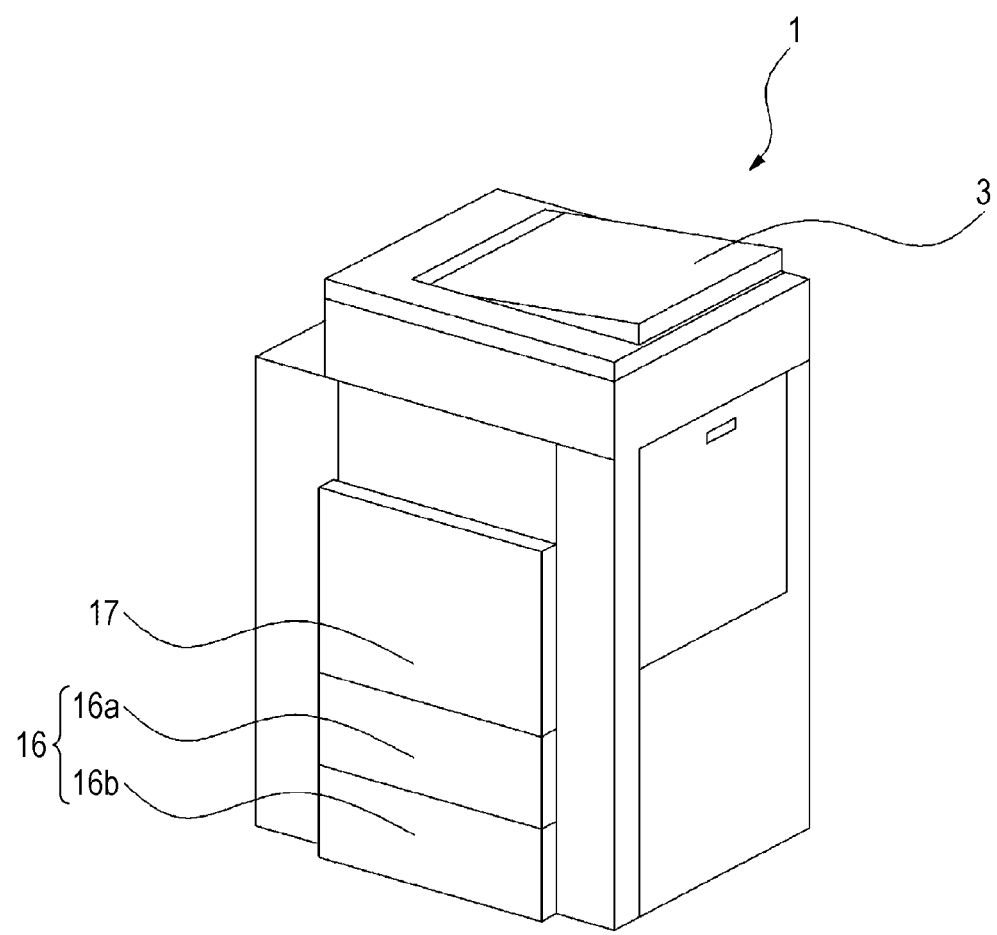
FIG. 1 is a perspective view illustrating an example of the appearance of an image forming apparatus of a first embodiment.

Hereinafter, one or more embodiments of the present disclosure will be described with reference to the drawings. However, the scope of the disclosure is not limited to the disclosed embodiments. Further, common elements in the embodiments to be described below will be denoted by the same reference numerals and the repeated description thereof will be omitted.

First Embodiment

FIG. 1 is a diagram illustrating an example of the configuration of an image forming apparatus 1 that is a first embodiment of the present disclosure. The image forming apparatus 1 has a printer function and executes print jobs input by users. For example, the image forming apparatus 1 can be connected to a network, such as a local area network (LAN). Accordingly, when receiving print jobs from other computers through a network, the image forming apparatus 1 can activate the printer function and outputs a printed matter on the basis of image data included in the print jobs. Further, the image forming apparatus 1 can also receive print jobs from portable terminals, such as smartphones and tablet terminals, and execute the print jobs.

This image forming apparatus 1 is an apparatus to be shared and used by a plurality of users, and is installed at the center of, for example, an office or the like. For this reason, users who input print jobs to the image forming apparatus 1 move toward the image forming apparatus 1 in various directions around the image forming apparatus 1, and acquire one's own printed matters.

The image forming apparatus 1 includes a sheet discharge tray 3 to which printed matters are to be output, an image forming unit 17 that forms images on printing sheets, and a plurality of sheet feed units 16 that feed the printing sheets to the image forming unit 17. Further, a panel-less image forming apparatus 1, which is not provided with an operation panel on which a user directly performs an operation for the image forming apparatus 1, is exemplified in this embodiment. However, the image forming apparatus 1 is not limited thereto, and may include an operation panel.

For example, the sheet discharge tray 3 is provided at an upper portion of the image forming apparatus 1. For this reason, the image forming apparatus 1 can output printed matters to the sheet discharge tray 3 which is provided at the upper portion thereof from which a user can easily acquire printed matters even in a case where the user approaches the image forming apparatus 1 in any direction to acquire the printed matters.

Further, the image forming unit 17 is provided at a central portion of the image forming apparatus 1 and the plurality of sheet feed units 16 are provided at a lower portion of the image forming apparatus 1. When executing a print job, the image forming apparatus 1 selects one sheet feed unit 16 among the plurality of sheet feed units 16, feeds a printing sheet from the selected sheet feed unit 16, and conveys the printing sheet to the image forming unit 17 along a sheet conveying path provided in the apparatus. Then, the image forming apparatus 1 forms an image, which is based on the image data included in the print job, by the image forming unit 17, transfers the image to the printing sheet, and fixes the image to the printing sheet. After that, the image forming apparatus 1 discharges the printing sheet on which the image is formed onto the sheet discharge tray 3 as a printed matter.

The plurality of sheet feed units 16 store printing sheets having the same size, and keep the printing sheets in a state where the orientations of the printing sheets are different from each other. In this embodiment, two sheet feed units 16a and 16b are illustrated as the plurality of sheet feed units 16. For example, printing sheets having an A4 size are set in the upper sheet feed unit 16a in a state where the printing sheets are placed lengthwise with respect to a sheet feed direction, and a sheet feed mode corresponds to a short edge feed (SEF). Further, printing sheets having an A4 size are set in the lower sheet feed unit 16b in a state where the printing sheets are placed widthwise with respect to the sheet feed direction, and a sheet feed mode corresponds to a long edge feed (LEF). That is, printing sheets having the same size are set with different orientations in the plurality of sheet feed units 16 so that the printing sheets can be fed in different directions. Meanwhile, the number of the sheet feed units 16 is not limited to 2.

Furthermore, when the image forming apparatus 1 forms an image based on the image data by the image forming unit 17, the image forming apparatus 1 can rotate the image. For example, when the image forming apparatus 1 forms an image to be transferred to a printing sheet, the image forming apparatus 1 can set the rotation angle of the image to any one of 0°, 90°, 180°, and 270°. Further, the image forming apparatus 1 of this embodiment determines one output mode among four output modes through a combination of the above-mentioned two sheet feed modes and the four rotation angles when outputting a printed matter based on a print job.

FIGS. 2A to 2D are diagrams illustrating the four output modes of the image forming apparatus 1. Meanwhile, an XY coordinate system, which is set in the image forming apparatus 1, is illustrated in the FIGS. 2A to 2D.

Figure 2A:
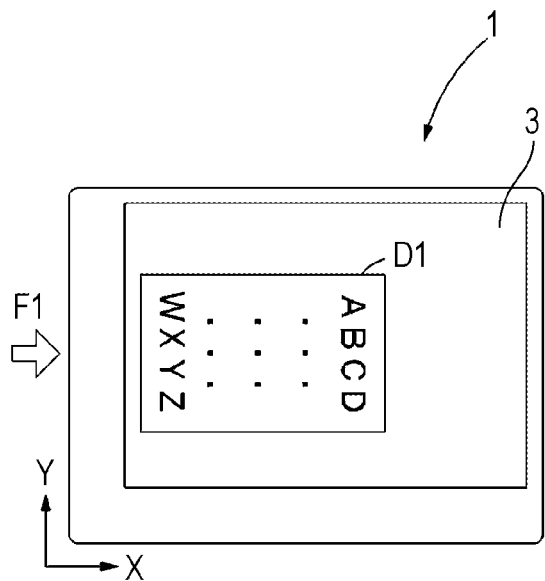
FIGS. 2A to 2D are diagrams illustrating examples of the output modes of a printed matter.

First, FIG. 2A illustrates a first output mode. In the first output mode, a printed matter D1 of the first output mode is output to the sheet discharge tray 3. For example, the first output mode is an output mode where a printing sheet is fed from the upper sheet feed unit 16a in the manner of SEF and an image is printed at the rotation angle of the image set to 0°. The first output mode is an output mode where a user can acquire the printed matter from the front when the user approaches the image forming apparatus 1 in a direction indicated by an arrow F1 illustrated in FIG. 2A and acquires the printed matter.

Figure 2B:
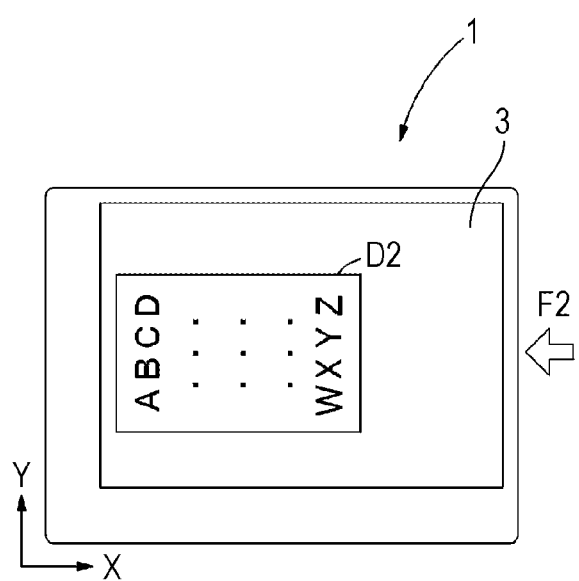

FIG. 2B illustrates a second output mode. In the second output mode, a printed matter D2 of the second output mode is output to the sheet discharge tray 3. For example, the second output mode is an output mode where a printing sheet is fed from the upper sheet feed unit 16a in the manner of SEF and an image is printed at the rotation angle of the image set to 180°. When the second output mode is compared with the first output mode, the orientation of the image in the second output mode is opposite to that in the first output mode. Accordingly, the second output mode is an output mode where a user can acquire the printed matter from the front when the user approaches the image forming apparatus 1 in a direction indicated by an arrow F2 illustrated in FIG. 2B and acquires the printed matter.

Figure 2C:
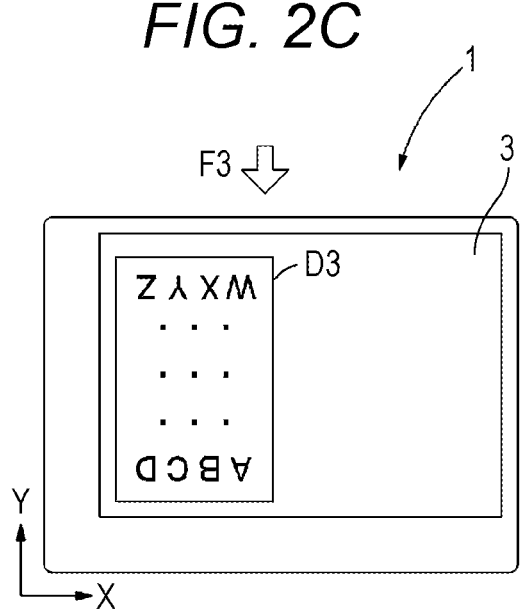

FIG. 2C illustrates a third output mode. In the third output mode, a printed matter D3 of the third output mode is output to the sheet discharge tray 3. For example, the third output mode is an output mode where a printing sheet is fed from the lower sheet feed unit 16b in the manner of LEF and an image is printed at the rotation angle of the image set to 90°. When the third output mode is compared with the first output mode, the orientation of the image in the third output mode is rotated from that in the first output mode by an angle of 90°. Accordingly, the third output mode is an output mode where a user can acquire the printed matter from the front when the user approaches the image forming apparatus 1 in a direction indicated by an arrow F3 illustrated in FIG. 2C and acquires the printed matter.

Figure 2D:
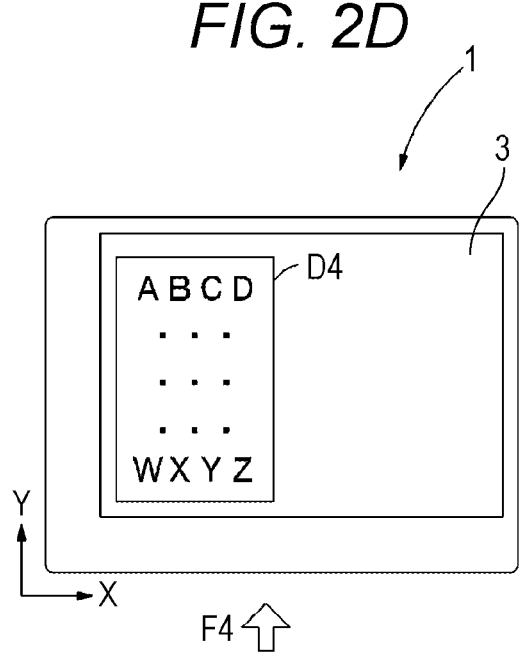

FIG. 2D illustrates a fourth output mode. In the fourth output mode, a printed matter D4 of the fourth output mode is output to the sheet discharge tray 3. For example, the fourth output mode is an output mode where a printing sheet is fed from the lower sheet feed unit 16b in the manner of LEF and an image is printed at the rotation angle of the image set to 270°. When the fourth output mode is compared with the third output mode, the orientation of the image in the fourth output mode is opposite to that in the third output mode. Accordingly, the fourth output mode is an output mode where a user can acquire the printed matter from the front when the user approaches the image forming apparatus 1 in a direction indicated by an arrow F4 illustrated in FIG. 2D and acquires the printed matter.

The image forming apparatus 1 can output printed matters in the above-mentioned four output modes. Further, when the image forming apparatus 1 receives a print job, the image forming apparatus 1 specifies a user inputting the print job, determines one output mode among the four output modes on the basis of the position of the user and the like, and outputs a printed matter in the determined output mode. That is, the image forming apparatus 1 is to output a printed matter in an output mode where the user can acquire the printed matter from the front according to a direction where the user acquires the printed matter. Accordingly, since a printed matter is output in a state where the image of the printed matter faces the user when the user moves to the installation location of the image forming apparatus 1 to acquire the printed matter, the user can grasp that the printed matter is one's own printed matter at a glance. This image forming apparatus 1 will be described in detail below.

FIG. 3 is a diagram illustrating an example of hardware components and functional components of the image forming apparatus 1. The image forming apparatus 1 includes a communication unit 10, a printer unit 13, a storage unit 18, and a control unit 19 as the hardware components.

The communication unit 10 includes a network interface 11. The network interface 11 is an interface that is used to connect the image forming apparatus 1 to a network, such as LAN. The image forming apparatus 1 communicates with portable terminals and computers possessed by users through the network interface 11. Meanwhile, a wireless communication unit, which wirelessly communicates with portable terminals possessed by users, may be mounted on the communication unit 10.

The printer unit 13 is to execute print jobs to output a printed matter. The printer unit 13 includes the plurality of sheet feed units 16 and the image forming unit 17 having been described above. The sheet feed units 16 and the image forming unit 17 are controlled by the control unit 19, and perform operations synchronized with each other when a print job is executed in the image forming apparatus 1. For example, when a print job is executed in the image forming apparatus 1, the printer unit 13 feeds a printing sheet from a sheet feed unit 16 that is designated by the control unit 19 among the plurality of sheet feed units 16. Further, the printer unit 13 drives the image forming unit 17 on the basis of image data output from the control unit 19 to form an image that is based on image data designated by the control unit 19. Then, after the printer unit 13 transfers the image, which is formed by the image forming unit 17, to the printing sheet fed from the sheet feed unit 16, the printer unit 13 fixes the image to the printing sheet and discharges the printing sheet onto the sheet discharge tray 3.

The storage unit 18 is a nonvolatile storage that is formed of a hard disk drive (HDD), a solid state drive (SSD), or the like. The storage unit 18 is to store various programs, data, and the like. For example, a program 20, user information 40, map information 41, and the like are stored in the storage unit 18 as illustrated in FIG. 3.

The program 20 is a program that is executed in the image forming apparatus 1, and is a program that is installed in the image forming apparatus 1 in advance. For example, the image forming apparatus 1 reads and executes the program 20, when power is applied, to cause various processing units, which are to be described later, to function.

The user information 40 is information registered in advance by users who use the image forming apparatus 1. Information about a plurality of users is registered in the user information 40. For example, pieces of information, such as user identification information (for example, user names, user IDs, or the like) used to specify users, terminal identification information used to identify information processing devices, such as computers and portable terminals used by users, seat information representing the positions of users' seats in an office, and feature information in which features of users' faces, other physical features, and the like are recorded, are registered for each user in the user information 40.

Figure 4A:
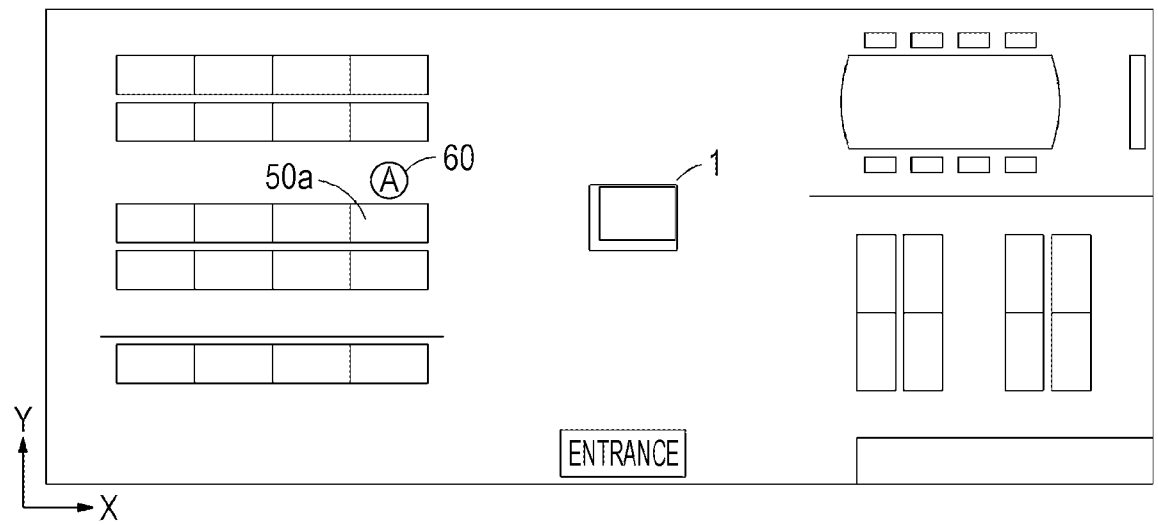
FIGS. 4A and 4B are diagrams illustrating examples of the output modes of a printed matter that are determined by an output mode determination unit of the first embodiment.
Figure 4B:
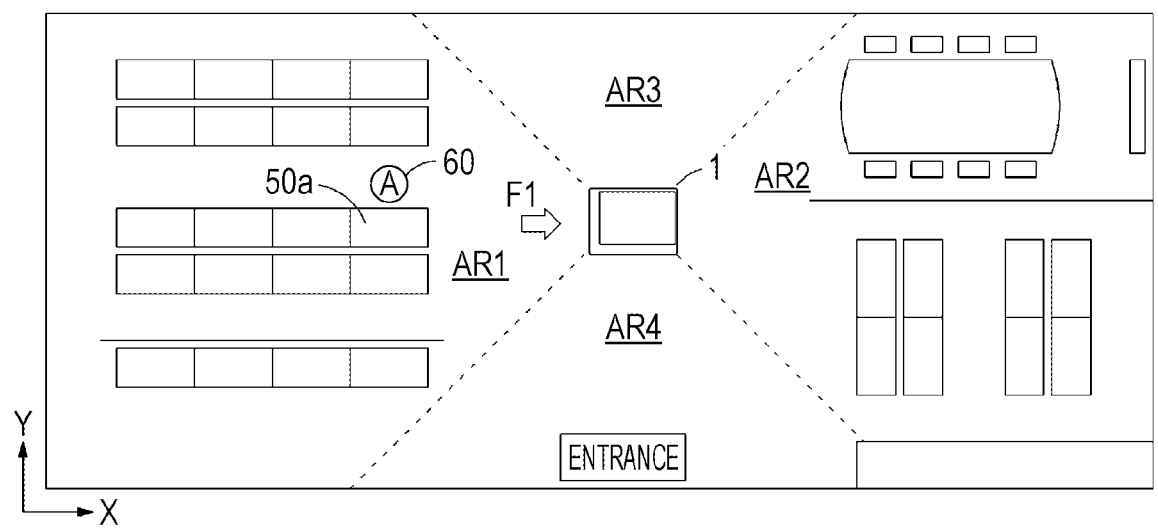

The map information 41 is two-dimensional information that represents the floor map of an office where the image forming apparatus 1 is installed. FIGS. 4A and 4B are diagrams illustrating examples of the map information 41. For example, in the map information 41 illustrated in FIG. 4A, the image forming apparatus 1 is disposed at the center of a map area defined by an XY Cartesian coordinate system and the positions of users' desks, the position of a meeting space, and the like present around the image forming apparatus 1 are registered in advance. Meanwhile, the XY coordinate system in the map information 41 matches the XY coordinate system that is illustrated in FIGS. 2A to 2D and is set in the image forming apparatus 1.

The control unit 19 includes a CPU and a memory (not illustrated), and the like. The CPU is to execute the program 20, and the memory is to store temporary data, which is generated when the CPU executes the program 20, and the like. Further, the control unit 19 includes an image memory 21, which is used to store image data included in print jobs, in addition to the above-mentioned memory. The image memory 21 has storage capacity enough to store image data that is to be printed on at least one printing sheet.

When power is applied to the image forming apparatus 1, the CPU of the control unit 19 reads the program 20 from the storage unit 18 and executes the program 20. Accordingly, the control unit 19 functions as a job receiving unit 30, a user specifying unit 31, a position information acquisition unit 32, an output mode determination unit 33, and a print-out unit 34. When a print job is input to the image forming apparatus 1, as described above, these respective units function to specify a user inputting the print job, to acquire position information of the specified user, and to output a printed matter in an output mode based on the position information of the specified user. The details of these respective units will be described below.

The image memory 21 is a memory that stores image data as an object to be printed out. For example, when the image forming apparatus 1 receives a print job through a network, the image forming apparatus 1 stores the print job in the storage unit 18. Then, when the image forming apparatus 1 executes the print job stored in the storage unit 18, the image forming apparatus 1 sequentially reads image data from the print job and develops the image data in the image memory 21. In this way, the print job is executed on the basis of the image data developed in the image memory 21.

The job receiving unit 30 is a processing unit that receives a print job input by a user. For example, when the job receiving unit 30 receives a print job through the communication unit 10, the job receiving unit 30 temporarily stores the print job in the storage unit 18. Then, the job receiving unit 30 reads image data corresponding to one printing sheet from the print job stored in the storage unit 18, and stores the image data in the image memory 21. However, in a case where the image memory 21 has storage capacity corresponding to a plurality of printing sheets, the job receiving unit 30 may be adapted to store image data corresponding to a plurality of printing sheets in the image memory 21. Further, when the job receiving unit 30 receives a print job, the job receiving unit 30 extracts information about the user included in header information and the like of the print job. The information about the user is information that allows the user, who inputs the print job, to be specified, and is, for example, a user name, a user ID, or the like. Then, the job receiving unit 30 outputs the information about the user to the user specifying unit 31.

The user specifying unit 31 is a processing unit that specifies a user inputting a print job. When information about a user inputting a print job is input to the user specifying unit 31 from the job receiving unit 30, the user specifying unit 31 refers to the user information 40 stored in the storage unit 18. The user specifying unit 31 compares the information about the user, who inputs the print job, with the user information 40 and determines whether or not the information about the user inputting the print job is registered in the user information 40. As a result, in a case where the information about the user is registered in the user information 40, the user specifying unit 31 determines that the received print job is an appropriate job and specifies the user who inputs the job. When the user specifying unit 31 specifies the user who inputs the job, the user specifying unit 31 outputs user specifying information to the position information acquisition unit 32. Identification information of the user inputting the print job is included in the user specifying information.

The position information acquisition unit 32 is a processing unit that acquires the position information of the user as the user inputting the print job is specified by the user specifying unit 31. The position information acquisition unit 32 of this embodiment acquires the position information of the user on the basis of the user information 40 stored in the storage unit 18. That is, when the user specifying information is input to the position information acquisition unit 32 from the user specifying unit 31, the position information acquisition unit 32 refers to the user information 40 and acquires the seat information of the user inputting the print job as position information. Further, the position information acquisition unit 32 refers to the map information 41 stored in the storage unit 18 and specifies the position of a seat corresponding to the seat information of the user. Then, the position information acquisition unit 32 specifies the position of the user, which is based on the installation position of the image forming apparatus 1, on the basis of the position of the user's seat. That is, the position information acquisition unit 32 is to specify a position and a direction where the position of the user's seat is present around the image forming apparatus 1. When the position information acquisition unit 32 specifies the position of the user, the position information acquisition unit 32 outputs position information, which represents the position of the user, to the output mode determination unit 33.

The output mode determination unit 33 is a processing unit that determines the output mode of a printed matter on the basis of the position information of the user acquired by the position information acquisition unit 32. The output mode determination unit 33 divides an area around the image forming apparatus 1 into a plurality of areas in advance and manages the plurality of areas. For example, the output mode determination unit 33 divides an area around the image forming apparatus 1 into four areas at a predetermined angle interval, so that the output mode determination unit 33 manages an area around the image forming apparatus 1 as four areas radially divided. These four areas are areas that are set so as to correspond to the four respective output modes.

Further, the output mode determination unit 33 specifies an area where a user is positioned among the four areas on the basis of the position information of a user. For example, the output mode determination unit 33 is to specify an area where the user is positioned among the four areas by mapping the position information of the user to the map information 41. Furthermore, the output mode determination unit 33 determines one output mode among the four output modes according to the specified area.

The summary of processing for determining an output mode will be described with reference to FIGS. 4A and 4B. For example, in a case where a user A is specified as a user inputting a print job, the output mode determination unit 33 acquires position information representing a position 60 of the user A. That is, the position 60 of the user A is specified as a position corresponding to a seat position 50a of the user A in the user information 40. For this reason, the output mode determination unit 33 specifies the position 60 of the user, which is based on the image forming apparatus 1, as illustrated in FIG. 4A by mapping the position 60 of the user A to the map information 41.

Further, the output mode determination unit 33 manages an area around the image forming apparatus 1 as four areas AR1, AR2, AR3, and AR4 as illustrated in FIG. 4B. Further, the output mode determination unit 33 specifies an area, which includes the position 60 of the user A specified as described above, among the four areas AR1 to AR4. In the case of the example of FIG. 4B, the output mode determination unit 33 specifies that the user A inputting a print job is positioned in the first area AR1. Then, when the user A positioned in the first area AR1 is to acquire a printed matter, the output mode determination unit 33 determines that the user A approaches the image forming apparatus 1 in the direction indicated by the arrow F1 and determines the above-mentioned first output mode as the output mode of the printed matter. Accordingly, when the print job of the user A is executed in the image forming apparatus 1, the printed matter D1 of the first output mode is output.

In contrast, in a case where the user A is positioned in the second area AR2, the output mode determination unit 33 determines the second output mode as the output mode of the printed matter. In this case, when the print job of the user A is executed in the image forming apparatus 1, the printed matter D2 of the second output mode is output. Further, in a case where the user A is positioned in the third area AR3, the output mode determination unit 33 determines the third output mode as the output mode of the printed matter. In this case, when the print job of the user A is executed in the image forming apparatus 1, the printed matter D3 of the third output mode is output. Furthermore, in a case where the user A is positioned in the fourth area AR4, the output mode determination unit 33 determines the fourth output mode as the output mode of the printed matter. In this case, when the print job of the user A is executed in the image forming apparatus 1, the printed matter D4 of the fourth output mode is output.

The print-out unit 34 is to control the execution of a print job in the image forming apparatus 1. As the output mode of a printed matter is determined by the output mode determination unit 33, the print-out unit 34 selects one sheet feed unit 16 among the plurality of sheet feed units 16 and determines the rotation angle of an image at the time of formation of the image so that the mode of the printed matter becomes the determined output mode. For example, in a case where the first output mode is determined as the output mode of the printed matter, the print-out unit 34 makes a determination so that a printing sheet is fed from the upper sheet feed unit 16a in the manner of SEF and the rotation angle of an image is set to 0°. Further, in a case where the second output mode is determined as the output mode of the printed matter, the print-out unit 34 makes a determination so that a printing sheet is fed from the upper sheet feed unit 16a in the manner of SEF and the rotation angle of an image is set to 180°. Furthermore, in a case where the third output mode is determined as the output mode of the printed matter, the print-out unit 34 makes a determination so that a printing sheet is fed from the lower sheet feed unit 16b in the manner of LEF and the rotation angle of an image is set to 90°. Moreover, in a case where the fourth output mode is determined as the output mode of the printed matter, the print-out unit 34 makes a determination so that a printing sheet is fed from the lower sheet feed unit 16b in the manner of LEF and the rotation angle of an image is set to 270°.

The print-out unit 34 includes an image rotating unit 35. The image rotating unit 35 is to perform processing for rotating an image on the image data stored in the image memory 21. For example, in a case where the first output mode is determined and the rotation angle of an image is 0°, the image rotating unit 35 does not particularly function. In this case, the print-out unit 34 outputs the image data to the printer unit 13 without performing processing for rotating an image on the image data stored in the image memory 21.

In contrast, since the rotation angle of the image is not 0° when any one of the second to fourth output modes is determined, the image rotating unit 35 functions in the print-out unit 34. Then, when the image data stored in the image memory 21 is output to the printer unit 13, the image rotating unit 35 performs processing for rotating an image. That is, the image rotating unit 35 is to perform processing for rotating an image by an angle of 180° in a case where the second output mode is determined, is to perform processing for rotating an image by an angle of 90° in a case where the third output mode is determined, and is to perform processing for rotating an image by an angle of 270° in a case where the fourth output mode is determined. Accordingly, the image data output to the printer unit 13 becomes image data corresponding to the output mode determined in the output mode determination unit 33, so that an image according to the output mode is formed in the printer unit 13.

The above-mentioned operation is performed in the print-out unit 34, so that a printed matter according to a direction where a user inputting a print job acquires a printed matter can be output. That is, since the printed matter is in a state where the front of the printed matter faces a user when the user moves to the installation location of the image forming apparatus 1 and acquires a printed matter, the user can quickly check whether or not the printed matter is a printed matter output for oneself. When each user inputs a print job to the image forming apparatus 1 of this embodiment from the position of one's own seat, the image forming apparatus 1 of this embodiment can output a printed matter in a direction where the front of the printed matter faces each user as described above.

Next, an example of the specific operation of the image forming apparatus 1 will be described. FIGS. 5A to 5C are flowcharts illustrating examples of the procedures of processing performed in the image forming apparatus 1. First, FIG. 5A is a flowchart illustrating the procedure of main processing performed in the image forming apparatus 1. This processing is started when the image forming apparatus 1 receives a print job. When the image forming apparatus 1 receives a print job (step S1), the image forming apparatus 1 performs processing for analyzing the print job (step S2). In this processing for analyzing the print job, the header information of the print job and the like are analyzed and information about a user inputting the print job is extracted. After that, the image forming apparatus 1 performs processing for specifying the user (step S3). In the processing for specifying the user, it is checked whether or not the user inputting the print job is a registered user. In a case where the user inputting the print job is a registered user, processing for specifying the registered user as the user inputting the print job is performed. In a case where the image forming apparatus 1 can specify the user inputting the print job, the image forming apparatus 1 then causes the position information acquisition unit 32 to function to perform processing for acquiring position information (step S4).

FIG. 5B is a flowchart illustrating an example of the detailed procedure of the processing for acquiring position information (step S4). When the position information acquisition unit 32 starts the processing for acquiring position information, the position information acquisition unit 32 refers to the user information 40 and acquires the seat information of the user inputting the print job (step S10). After that, the position information acquisition unit 32 checks the map information 41 (step S11) and specifies the seat position of a user corresponding to the seat information (step S12). In a case where the position information acquisition unit 32 can specify the seat position of the user, the position information acquisition unit 32 specifies the position of the user on the basis of the seat position (step S13). That is, the seat position of the user is specified as the position of the user. In a case where the position information acquisition unit 32 can specify the position of the user, the position information acquisition unit 32 outputs position information, which represents the position of the user, to the output mode determination unit 33 (step S14). The processing for acquiring position information (step S4) ends with this.

Returning to FIG. 5A, the image forming apparatus 1 then causes the output mode determination unit 33 to function to perform processing for determining an output mode (step S5).

FIG. 5C is a flowchart illustrating an example of the detailed procedure of the processing for determining the output mode (step S5). When the output mode determination unit 33 starts the processing for determining the output mode, the position information of the user is input to the output mode determination unit 33 from the position information acquisition unit 32 (step S20). After that, the output mode determination unit 33 specifies an area where the user inputting the print job is positioned among the four areas AR1 to AR4 around the image forming apparatus 1 on the basis of the position information of the user (step S21). In a case where the output mode determination unit 33 can specify one area where the user is positioned, the output mode determination unit 33 determines any one output mode of the first to fourth output modes as the output mode of a printed matter according to the specified one area (step S22). After that, the output mode determination unit 33 determines one sheet feed unit 16, which is to feed printing sheets, among the plurality of sheet feed units 16 on the basis of the determined output mode (step S23). In addition, the output mode determination unit 33 determines the rotation angle of an image, which is required at the time of formation of the image, on the basis of the determined output mode (step S24). At this time, any one of 0°, 90°, 180°, and 270° is determined as the rotation angle of the image according to the output mode of a printed matter. The processing for determining the output mode (step S5) ends with this.

Returning to FIG. 5A again, the image forming apparatus 1 then causes the print-out unit 34 to function to execute the print job (step S6). At this time, the print-out unit 34 causes a printing sheet to be fed to the printer unit 13 from one sheet feed unit 16 determined in step S23. Further, in a case where the rotation angle of the image determined in step S24 is any one of 90°, 180°, and 270°, the print-out unit 34 causes the image rotating unit 35 to function to perform processing for rotating the image. Then, the print-out unit 34 outputs image data, which is subjected to the processing for rotating the image, to the printer unit 13. Meanwhile, it goes without saying that the image data of the second and subsequent printing sheets are sequentially developed in the image memory 21 after the output of the image data of the first printing sheet and are subjected to the same processing. Since this kind of processing is performed, the printed matter of the output mode determined by the output mode determination unit 33 is output onto the sheet discharge tray 3. The image forming apparatus 1 ends the processing associated with the reception of the print job when the execution of the print job is completed.

When the image forming apparatus 1 of this embodiment receives a print job, as described above, the image forming apparatus 1 specifies a user inputting the print job and acquires the position information of the user inputting the print job with reference to the user information 40 stored in the storage unit 18. Further, the image forming apparatus 1 specifies the relative position of the user, which is based on the installation position of the image forming apparatus 1, on the basis of the acquired position information of the user and the map information 41. Then, the image forming apparatus 1 specifies an area where the user is positioned among the four areas AR1 to AR4 on the basis of the relative position of the user around the image forming apparatus 1. The image forming apparatus 1 determines the output mode of a printed matter among the four output modes on the basis of the specified area, executes the print job so that the output mode of the printed matter becomes the determined output mode, and outputs the printed matter. Accordingly, the output mode of the printed matter is switched according to the position of the user inputting the print job, and the printed matter is output in a state where the front of the printed matter faces the user when the user acquires the printed matter. For this reason, the user can easily check whether or not the printed matter is one's own printed matter when the user acquires the printed matter output onto the sheet discharge tray 3.

Second Embodiment

Next, a second embodiment of the present disclosure will be described. One aspect where the position of a user is specified on the basis of the seat information included in the user information 40 stored in advance has been described in the first embodiment. In contrast, one aspect where the position of a user is specified on the basis of the position information of a portable terminal possessed by the user will be described in this embodiment.

Figure 6:
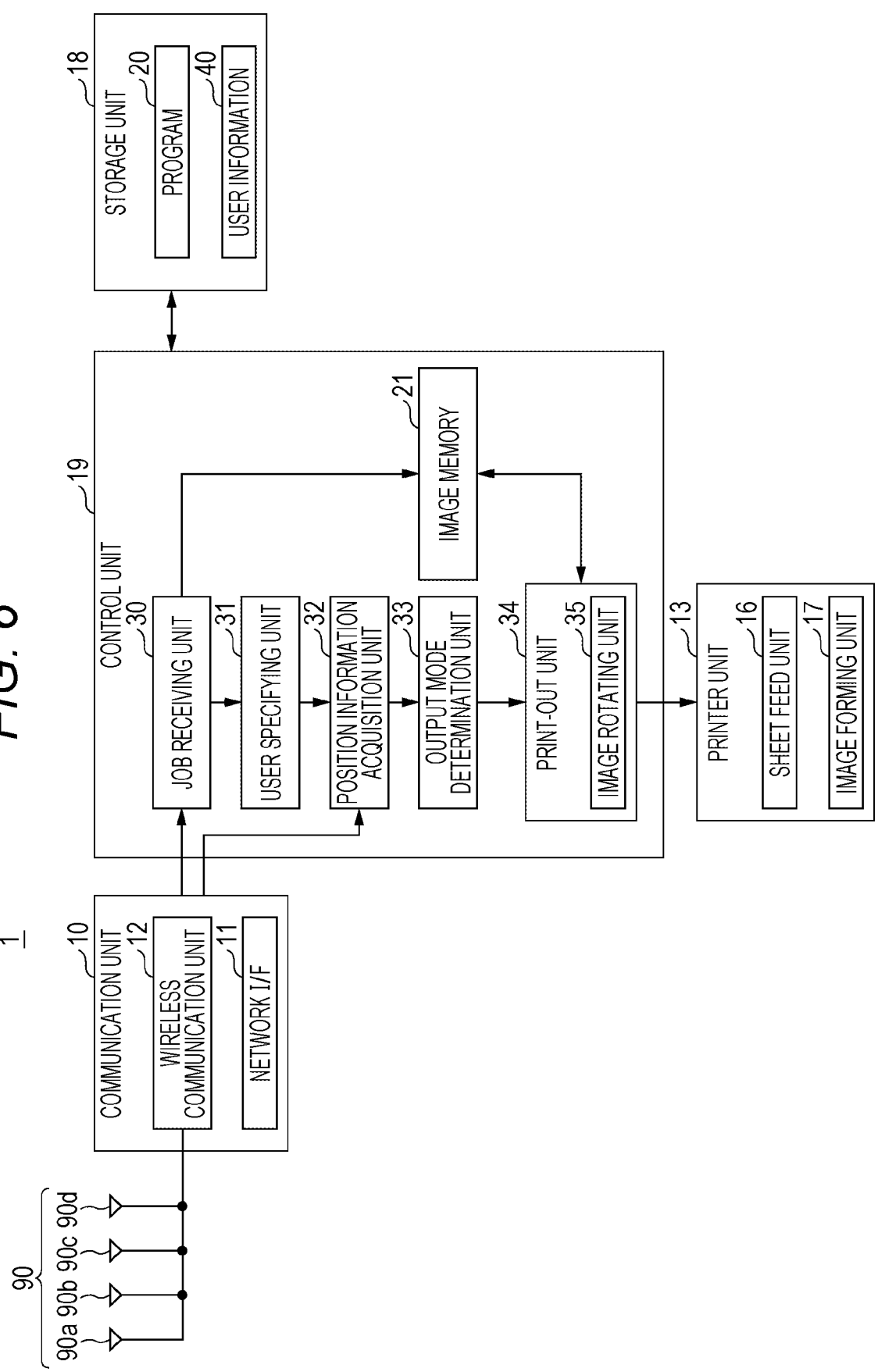
FIG. 6 is a diagram illustrating an example of hardware components and functional components of an image forming apparatus of a second embodiment.

FIG. 6 is a diagram illustrating an example of hardware components and functional components of an image forming apparatus 1 of this embodiment. The image forming apparatus 1 of this embodiment includes a communication unit 10, a printer unit 13, a storage unit 18, and a control unit 19 as in the first embodiment. The image forming apparatus 1 of this embodiment further includes an antenna 90 that communicates with a portable terminal possessed by a user.

Meanwhile, anything functioning as a wireless communication spot may be used as the antenna 90.

The communication unit 10 includes the network interface 11 described in the first embodiment and a wireless communication unit 12. The wireless communication unit 12 is to make wireless communication, such as Bluetooth (registered trademark), WiFi, or near field communication (NFC), and can communicate with, for example, a portable terminal possessed by a user one to one.

The wireless communication unit 12 of this embodiment wirelessly communicates with a portable terminal through the antenna 90. The image forming apparatus 1 includes a plurality of antennas 90$a$, 90$b$, 90$c$, and 90$d$ as the antenna 90 that wirelessly communicates with a portable terminal. These plurality of antennas 90$a$, 90$b$, 90$c$, and 90$d$ are provided on, for example, four side surfaces of the image forming apparatus 1, respectively, and individually receive radio waves generated from a user's portable terminal. Since the respective antennas 90$a$, 90$b$, 90$c$, and 90$d$ are provided on different side surfaces of the image forming apparatus 1, the intensities of radio waves received by the respective antennas 90$a$, 90$b$, 90$c$, and 90$d$ vary according to the position of a user around the image forming apparatus 1. For this reason, the position of a user is specified in this embodiment on the basis of the intensities of radio waves received by the respective antennas 90$a$, 90$b$, 90$c$, and 90$d$. This will be described in detail below.

For example, a case where the image forming apparatus 1 receives a print job from a user's portable terminal by wirelessly communicating with the user's portable terminal is supposed. In this case, a job receiving unit 30 receives a print job that is received through the wireless communication unit 12. Then, the job receiving unit 30 stores image data of at least the first printing sheet in the image memory 21.

When the print job is received by the job receiving unit 30, a user specifying unit 31 specifies a user inputting the print job. An operation performed in the user specifying unit 31 at this time is the same as that described in the first embodiment.

When the user inputting the print job is specified by the user specifying unit 31, the control unit 19 causes a position information acquisition unit 32 to function. The position information acquisition unit 32 specifies the relative position of the user, who inputs the print job, on the basis of the installation position of the image forming apparatus 1. The position information acquisition unit 32 of this embodiment specifies a direction where the user is positioned around the image forming apparatus 1 on the basis of the intensities of radio waves that are obtained in a case where the plurality of antennas 90$a$, 90$b$, 90$c$, and 90$d$ receive radio waves generated from the user's portable terminal. That is, since the antennas 90$a$, 90$b$, 90$c$, and 90$d$ are provided on the four side surfaces of the image forming apparatus 1, respectively, as described above, the intensities of radio waves received by the respective antennas 90$a$, 90$b$, 90$c$, and 90$d$ vary according to the direction where the user is positioned. The position information acquisition unit 32 is to specify the direction where the user is positioned by detecting a variation in the intensity of radio waves. In more detail, the position information acquisition unit 32 specifies that the user is positioned in the normal direction of the side surface on which the antenna receiving radio waves having the highest intensity is installed among the four side surfaces of the image forming apparatus 1. Then, in a case where the position information acquisition unit 32 can specify the direction where the user is positioned, the position information acquisition unit 32 generates position information representing the position of the user and outputs the position information to an output mode determination unit 33.

When the output mode determination unit 33 acquires the position information representing the position of the user from the position information acquisition unit 32, the output mode determination unit 33 specifies an area where the user is positioned among four areas AR1 to AR4 on the basis of the position information and determines the output mode of a printed matter on the basis of the specified area.

Figure 7A:
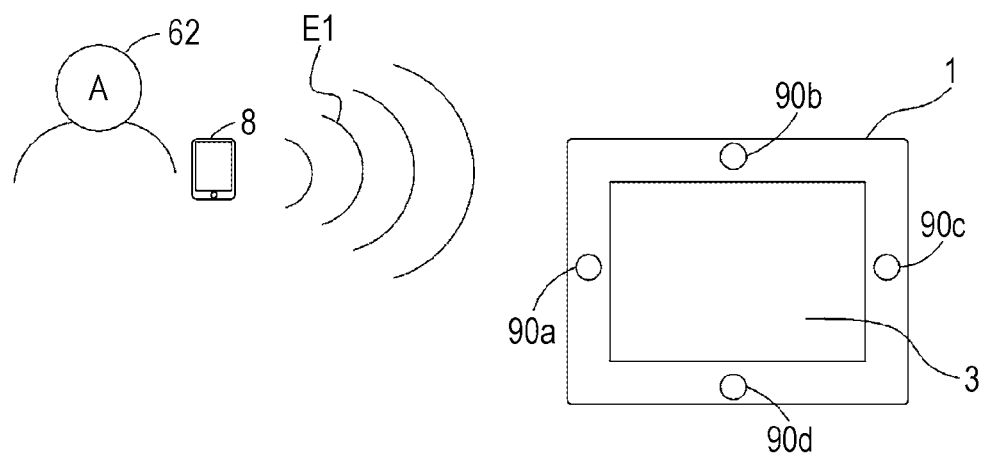
FIGS. 7A and 7B are diagrams illustrating examples of the output modes of a printed matter that are determined by an output mode determination unit of the second embodiment.
Figure 7B:
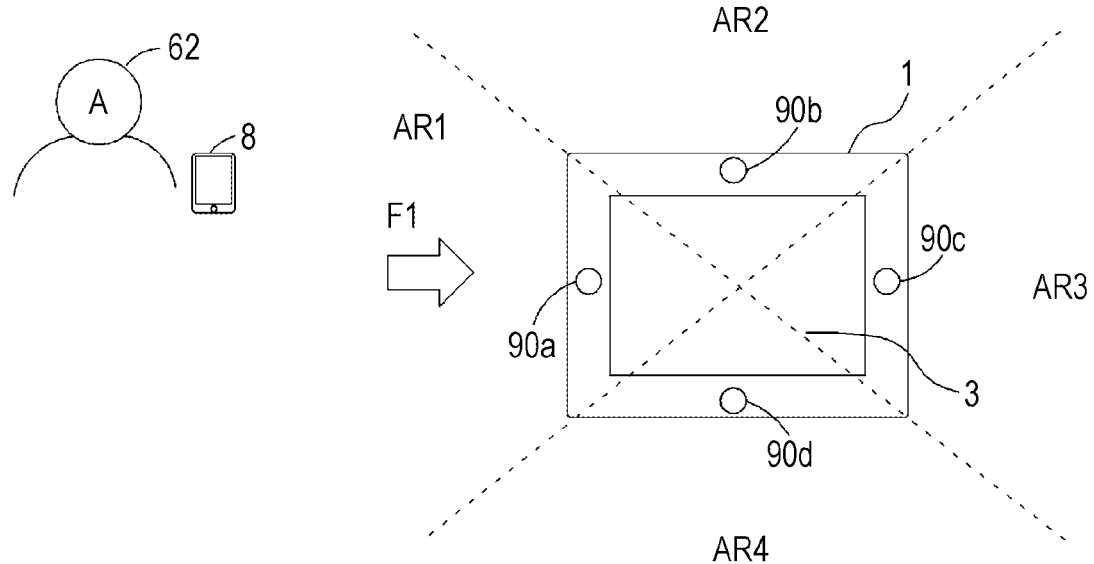

FIGS. 7A and 7B are diagrams illustrating a concept that determines the output mode of a printed matter in the output mode determination unit 33. FIG. 7A is a diagram illustrating an example of a positional relationship between a user and the image forming apparatus 1. As illustrated in FIG. 7A, antennas 90$a$ to 90$d$ are arranged on four side surfaces of the image forming apparatus 1 of this embodiment, respectively. For example, in a case where a user A sends a print job from a position, which faces the side surface on which the antenna 90$a$ is installed, using a portable terminal 8 as illustrated in FIG. 7A, an antenna of which the intensity of radio waves is highest among the four antennas 90$a$, 90$b$, 90$c$, and 90$d$ is the antenna 90$a$. For this reason, the position information acquisition unit 32 determines that the user A inputting the print job is positioned in the normal direction of the side surface on which the antenna 90$a$ is installed, and generates position information that represents the position of the user A.

When the output mode determination unit 33 acquires the position information representing the position of the user A, the output mode determination unit 33 specifies an area where the user A is positioned among the four areas AR1 to AR4 around the image forming apparatus 1 on the basis of the position information. In the case of an example of FIG. 7B, the output mode determination unit 33 specifies that the user A inputting the print job is positioned in the first area AR1. Then, when the user A positioned in the first area AR1 acquires the printed matter, the output mode determination unit 33 determines that the user A approaches the image forming apparatus 1 in a direction indicated by an arrow F1 and determines the first output mode described in first embodiment as the output mode of the printed matter. Accordingly, when the print job of the user A is executed in the image forming apparatus 1, a printed matter D1 of the first output mode is output.

Then, the print-out unit 34 controls the execution of the print job so that the output mode of the printed matter becomes the output mode determined by the output mode determination unit 33 as in the first embodiment when the print job is executed.

Next, an example of the specific operation of the image forming apparatus 1 of this embodiment will be described. The procedure of main processing performed by the image forming apparatus 1 is the same as that of the flowchart illustrated in FIG. 5A. However, the detail of the processing of step S4 illustrated in FIG. 5A in this embodiment is different from that in the first embodiment. For this reason, the detail of processing for acquiring position information (step S4) of this embodiment will be described.

Figure 8:
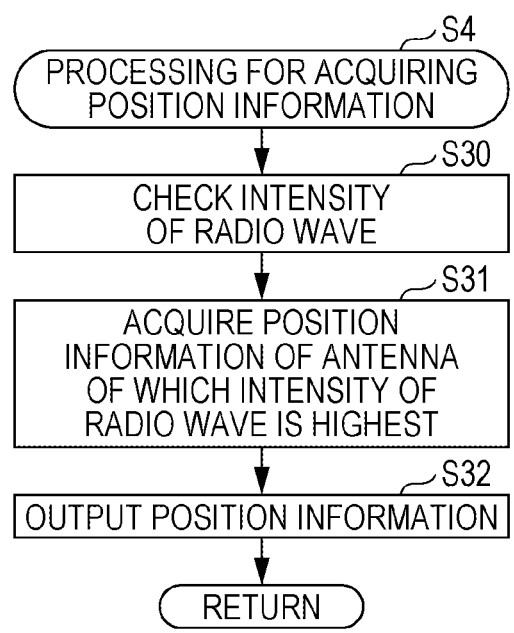
FIG. 8 is a flowchart illustrating an example of the procedure of processing performed in the image forming apparatus of the second embodiment.

FIG. 8 is a flowchart illustrating an example of the detailed procedure of the processing for acquiring position information (step S4) of this embodiment. When the position information acquisition unit 32 starts the processing for acquiring position information, the position information acquisition unit 32 checks the intensities of radio waves received by the four respective antennas 90$a$ to 90$d$ (step S30). Then, the position information acquisition unit 32 specifies an antenna, which receives radio waves having the highest intensity, among the four antennas 90a, 90b, 90c, and 90d, and generates position information, which represents the position of the user, on the basis of the specified antenna (step S31). Accordingly, the position information acquisition unit 32 can acquire position information representing the position of the user. Then, the position information acquisition unit 32 outputs the position information, which represents the position of the user, to the output mode determination unit 33 (step S32). The processing for acquiring position information (step S4) of this embodiment ends with this.

When the image forming apparatus 1 of this embodiment receives a print job through the wireless communication unit 12, as described above, the image forming apparatus 1 of this embodiment checks the intensities of radio waves received by the four respective antennas 90a to 90d and acquires position information, which represents the position of the user, on the basis of an antenna that receives radio waves having the highest intensity. Then, the image forming apparatus 1 specifies an area where the user is positioned among the four areas AR1 to AR4 on the basis of the position information representing the position of the user, determines the output mode of a printed matter according to the specified area, and executes the print job. Accordingly, even in a case where the image forming apparatus 1 of this embodiment cannot acquire the seat information of the user or a case where the image forming apparatus 1 of this embodiment does not keep the map information 41, the image forming apparatus 1 of this embodiment can specify the position of the user and output a printed matter in an output mode according to the position of the user.

Meanwhile, this embodiment is the same as the first embodiment except for the point described above in this embodiment. For this reason, the image forming apparatus 1 of this embodiment has the same effects as that of the first embodiment.

Third Embodiment

Next, a third embodiment of the present disclosure will be described. One aspect where the image of a user is taken by a camera provided in an image forming apparatus 1 and the position information of the user is acquired on the basis of the taken image will be described in this embodiment.

Figure 9:
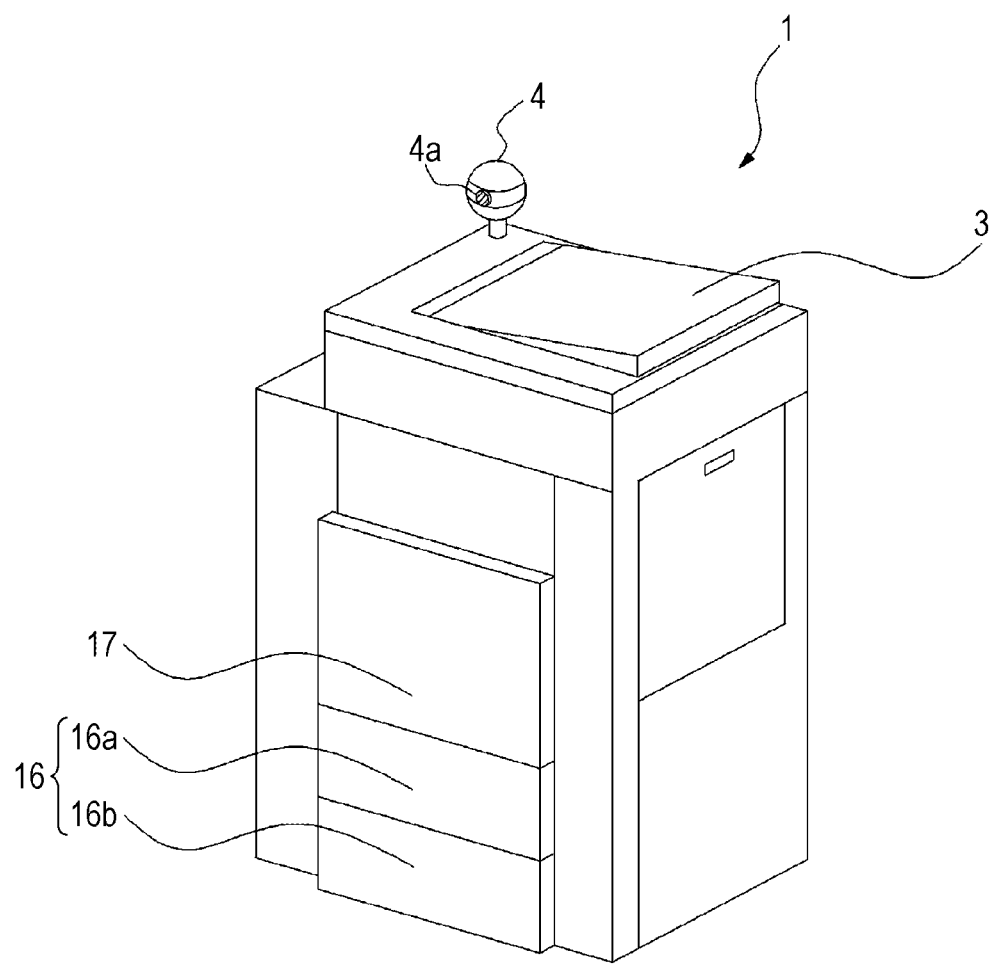
FIG. 9 is a perspective view illustrating an example of the appearance of an image forming apparatus of a third embodiment.

FIG. 9 is a diagram illustrating an example of the configuration of an image forming apparatus 1 of this embodiment. The image forming apparatus 1 includes a camera 4 as imaging means for imaging an area around the image forming apparatus 1. The camera 4 is an electronic camera that can take a still image or a video. Since the camera 4 includes an imaging unit 4a that horizontally rotates, the camera 4 can image an area around the image forming apparatus 1 at an angle of 360°. The camera 4 is used to image users present around the image forming apparatus 1. Meanwhile, a case where the camera 4 is provided at an upper portion of the image forming apparatus 1 is exemplified in FIG. 9, but the present disclosure is not limited thereto. For example, the camera 4 may be set on the ceiling, the walls, or the like of an office, and may be adapted to send a taken image to the image forming apparatus 1.

Figure 10:
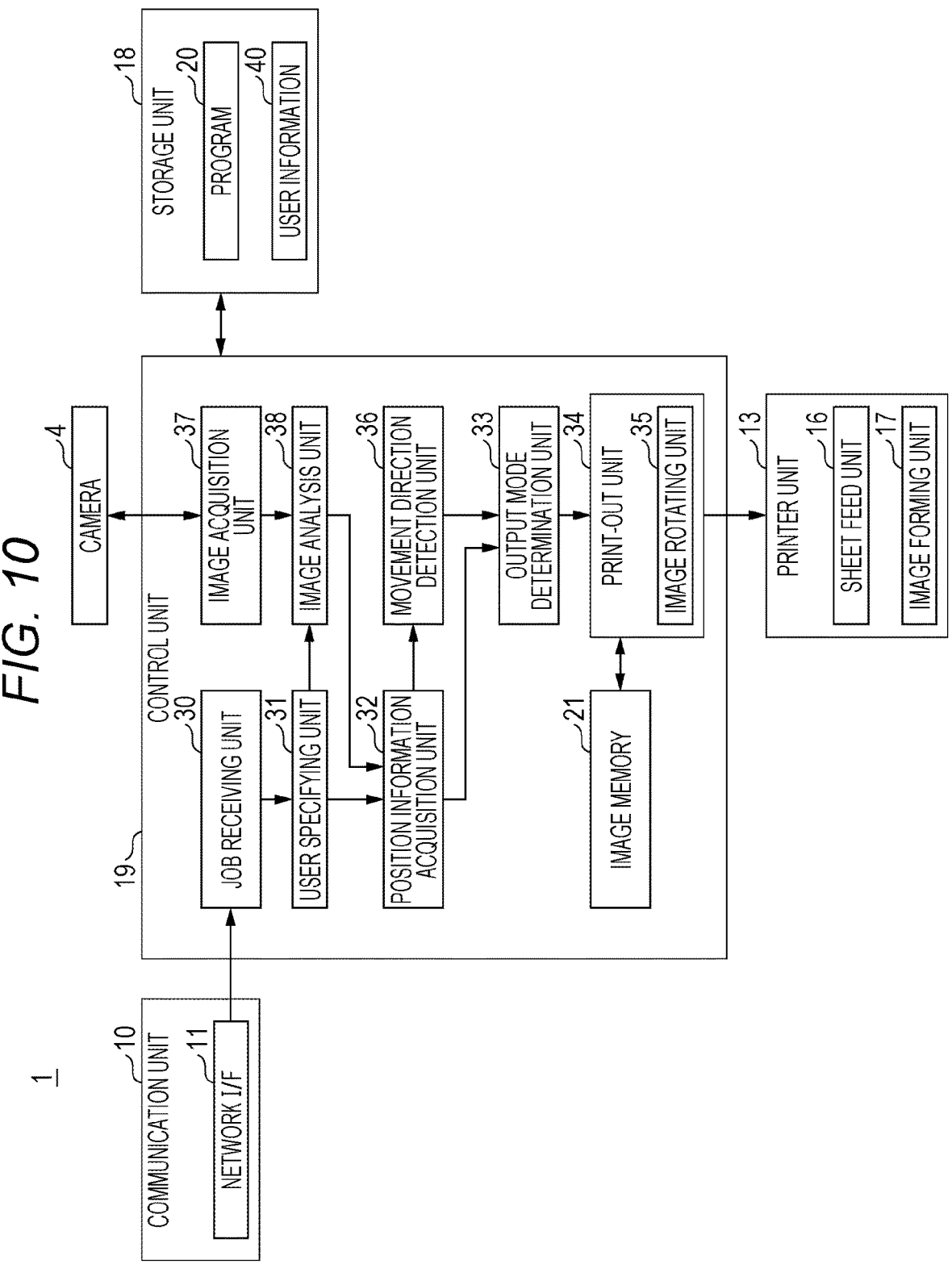
FIG. 10 is a diagram illustrating an example of hardware components and functional components of the image forming apparatus of the third embodiment.

FIG. 10 is a diagram illustrating an example of hardware components and functional components of the image forming apparatus 1 of this embodiment. The image forming apparatus 1 includes the above-mentioned camera 4, a communication unit 10, a printer unit 13, a storage unit 18, and a control unit 19.

The camera 4 starts an operation for imaging an area around the image forming apparatus 1 by the control from the control unit 19. For example, the camera 4 is operated by the reception of a print job in the image forming apparatus 1, and starts an operation for imaging an area around the image forming apparatus 1. Accordingly, the camera 4 starts to rotate in a horizontal direction, takes the image of the area around the image forming apparatus 1, which corresponds to an angle of 360°, at regular time intervals, and outputs images, which are obtained from the imaging, to the control unit 19. For example, the camera 4 starts an imaging operation at the time of reception of a print job, and ends the imaging operation at the time of execution of the print job. During this time, the camera 4 repeatedly takes the image of an area around the image forming apparatus 1, and outputs taken images to the control unit 19. Further, when the camera 4 outputs the taken images to the control unit 19, the camera 4 outputs imaging condition information, which represents imaging conditions (the rotation angle of the imaging unit 4a, the focal length and magnification of an imaging lens, and the like), to the control unit 19 together with the taken images.

A CPU (not illustrated) executes a program 20, so that the control unit 19 of this embodiment functions as a job receiving unit 30, a user specifying unit 31, a position information acquisition unit 32, an output mode determination unit 33, a print-out unit 34, a movement direction detection unit 36, an image acquisition unit 37, and an image analysis unit 38. Then, the control unit 19 of this embodiment analyzes the taken images obtained from the camera 4 at regular time intervals to determine whether or not the user inputting the print job is positioned around the image forming apparatus 1. In a case where the user positioned around the image forming apparatus 1 can be detected, the control unit 19 generates position information that represents the position of the user on the basis of an imaging direction where the user is imaged. Then, the control unit 19 determines the output mode of a printed matter on the basis of the position information. The operation of the control unit 19 as each unit will be described below.

When the job receiving unit 30 receives the print job, the job receiving unit 30 stores the print job in the storage unit 18 and stores image data included in the print job in the image memory 21. Further, when the job receiving unit 30 receives the print job, the job receiving unit 30 sends an imaging-start command to the camera 4 and starts an imaging operation to be performed by the camera 4. Accordingly, the camera 4 starts an operation for taking the image of an area around the image forming apparatus 1, and outputs the taken images to the control unit 19 at regular time intervals.

When the print job is received, the user specifying unit 31 specifies the user inputting the print job. A method of specifying the user is the same as that described in the above-mentioned embodiment. In a case where the user specifying unit 31 can specify the user inputting the print job, the user specifying unit 31 reads feature information of the user included in user information 40 and outputs the feature information to the image analysis unit 38. Information, such as features of a user's face and other physical features, is included in the feature information of the user.

The image acquisition unit 37 is a processing unit that acquires the taken images to be output from the camera 4 by the start of the imaging operation of the camera 4. When the image acquisition unit 37 acquires the taken images output from the camera 4 at regular time intervals, the image acquisition unit 37 outputs the taken images to the image analysis unit 38. Further, the image acquisition unit 37 acquires the imaging condition information together with the taken images. For this reason, the image acquisition unit 37 outputs both the taken images and the imaging condition information to the image analysis unit 38.

Whenever the image analysis unit 38 acquires the taken images output from the image acquisition unit 37 at regular time intervals, the image analysis unit 38 analyzes the taken images. For example, the image analysis unit 38 performs publicly known image analysis processing to determine whether or not a person appears in the taken image. In a case where a person appears in the taken image, the image analysis unit 38 performs processing for extracting features from the image of the person and generates feature information in which the features of the person are digitized. On the other hand, in a case where a person does not appear in the taken image, the image analysis unit 38 ends the image analysis without performing the processing for extracting features.

When the image analysis unit 38 generates the feature information of the person appearing in the taken image, the image analysis unit 38 compares the feature information with the feature information acquired from the user specifying unit 31 and determines whether or not the persons are the same. As a result, in a case where the image analysis unit 38 determines that the persons are not the same, the image analysis unit 38 ends the image analysis. In contrast, in a case where the image analysis unit 38 determines that the persons are the same, the image analysis unit 38 determines that the person appearing in the taken image is the user inputting the print job.

In a case where the user inputting the print job appears in the taken image, the image analysis unit 38 specifies an imaging direction where the user is imaged by the camera 4 on the basis of the imaging condition information input together with the taken images and specifies a direction where the user is present around the image forming apparatus 1. Then, the image analysis unit 38 outputs information, which represents the direction where the user is present, to the position information acquisition unit 32.

Figure 11A:
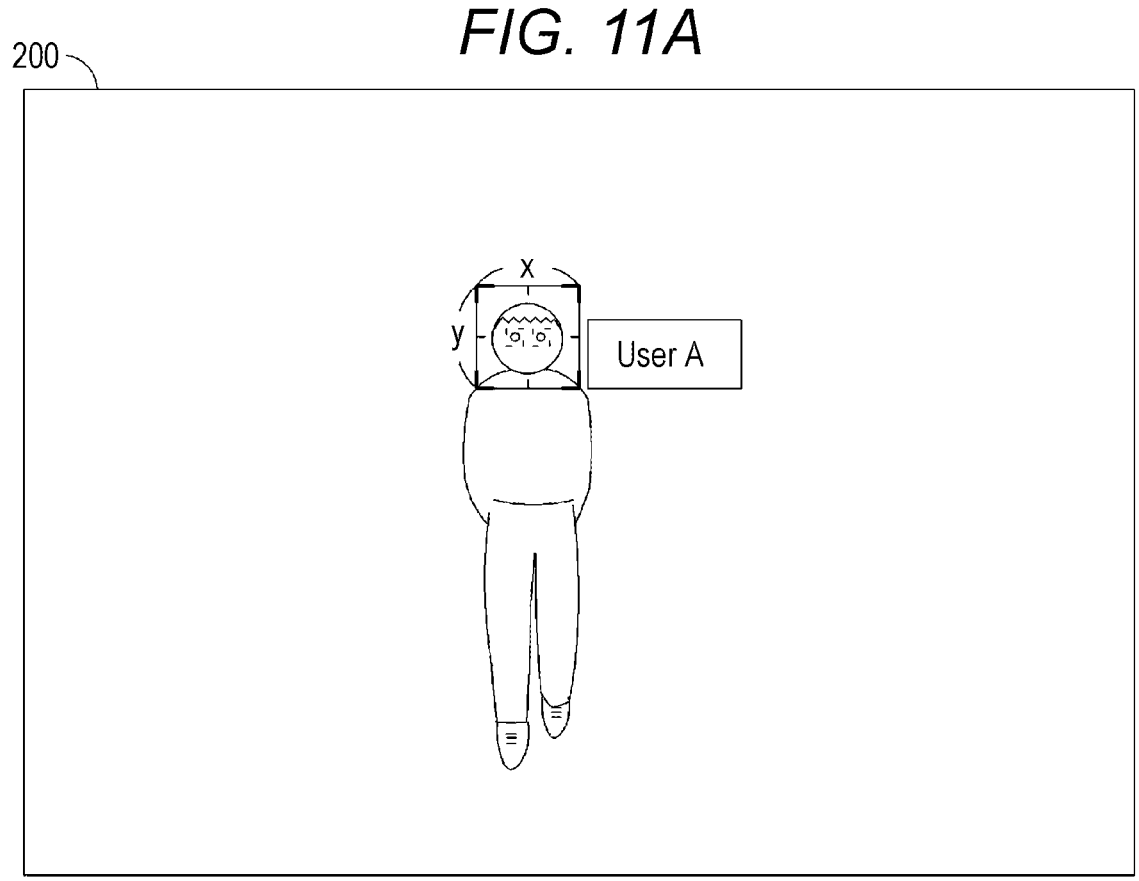
FIGS. 11A and 11B are diagrams illustrating an example where a position information acquisition unit acquires position information from an image.
Figure 11B:
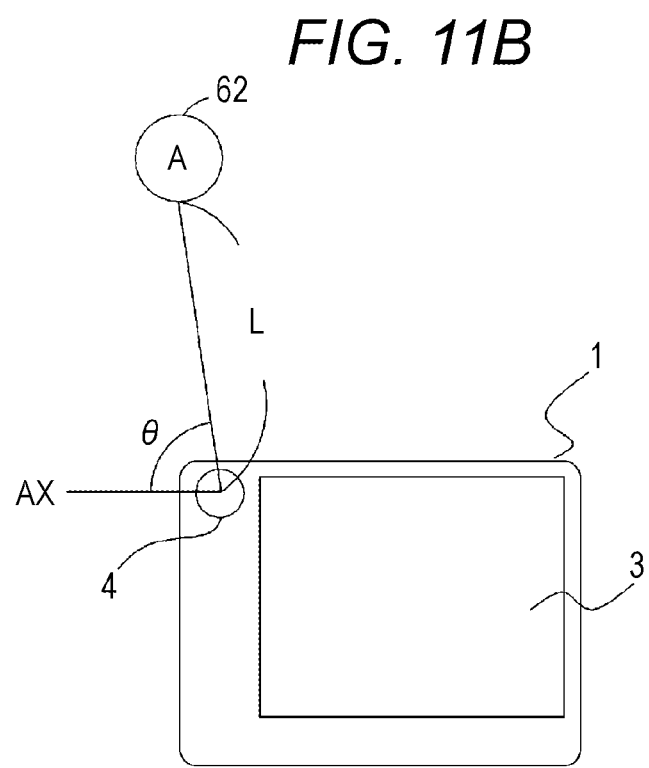

FIGS. 11A and 11B are diagrams illustrating the concept of the image analysis that is performed by the image analysis unit 38. For example, in a case where a taken image 200 illustrated in FIG. 11A is obtained, the image analysis unit 38 determines whether or not a person appears in the taken image 200. In a case where a person appears in the taken image, the image analysis unit 38 generates the feature information representing the features of the person. For example, in the case of facial recognition, the image analysis unit 38 extracts the face portion of the person included in the taken image. In the case of an example illustrated in FIG. 11A, an area having a length of x in a horizontal direction and a length of y in a vertical direction is extracted as the face portion of the person. Then, the image analysis unit 38 generates feature information from the image of the face of the person appearing in the taken image. In a case where the feature information of the person generated from the taken image matches the feature information input from the user specifying unit 31, the person appearing in the taken image can be specified as the user inputting the print job.

Further, if the image analysis unit 38 determines that the user inputting the print job appears in the taken image, the image analysis unit 38 can specify a direction where the user is positioned by specifying an imaging direction where the taken image is taken on the basis of the imaging condition information as illustrated in FIG. 11B. That is, the camera 4 has an initial position where an imaging direction matches a predetermined direction; can be rotated clockwise or counterclockwise from the initial position; and records information, which represents the rotation angle of the imaging direction from the initial position when the camera 4 takes an image, in the imaging condition information whenever the camera 4 takes an image. For this reason, the image analysis unit 38 can calculate a rotation angle $\theta$ of the imaging direction from a reference position AX on the basis of the information, which is included in the imaging condition information and represents the imaging direction, and can specify a direction where the user is positioned.

The position information acquisition unit 32 generates position information, which represents the position of the user, on the basis of information that is acquired from the image analysis unit 38. That is, the position information acquisition unit 32 is to generate position information, which represents the position of the user, on the basis of a direction where the user is present around the image forming apparatus 1. Then, the position information acquisition unit 32 outputs the position information to the output mode determination unit 33.

The output mode determination unit 33 specifies an area where the user inputting the print job is present among the four areas AR1 to AR4 around the image forming apparatus 1 on the basis of the position information obtained from the position information acquisition unit 32, and determines the output mode of a printed matter on the basis of the specified area. Then, as in the above-mentioned embodiment, the print-out unit 34 executes the print job in the output mode determined by the output mode determination unit 33 and outputs a printed matter.

As described above, the image forming apparatus 1 of this embodiment is adapted to take the image of an area around the image forming apparatus 1 by the camera 4 and to specify the position of a user inputting a print job on the basis of the taken image.

Incidentally, the image forming apparatus 1 of this embodiment not only can specify a direction where the user is positioned around the image forming apparatus 1 on the basis of the taken image as described above and determine the output mode of a printed matter on the basis of the position of the user, but also can image, for example, the user, who inputs the print job, plural times and analyze a plurality of taken images, which are obtained from the imaging, to specify the movement direction of the use. For this reason, since the image forming apparatus 1 specifies the movement direction of the user, the image forming apparatus 1 can also determine the output mode of a printed matter according to the movement direction of the user. This will be described in detail below.

For the detection of the movement direction of the user inputting the print job, the image analysis unit 38 determines whether or not the user inputting the print job appears in the taken image whenever the taken image is output from the image acquisition unit 37. Then, in a case where the user inputting the print job appears in the taken image, the image analysis unit 38 not only specifies a direction where the user is positioned around the image forming apparatus 1 as described above but also measures a distance L between the image forming apparatus 1 and the user as illustrated in FIG. 11B.

For example, in a case where the taken image 200 illustrated in FIG. 11A is acquired, the image analysis unit 38 measures the size of the image of the person (for example, the image of a face portion) included in the taken image 200. Then, the image analysis unit 38 calculates the distance L between the camera 4 and the person on the basis of the size of the image of the person and the focal length and magnification of the imaging lens. Accordingly, the distance L between the image forming apparatus 1 and the user inputting the print job is obtained.

Then, the image analysis unit 38 outputs the direction where the user is present and the distance L between the image forming apparatus 1 and the user to the position information acquisition unit 32. In a case where the image analysis unit 38 repeats the above-mentioned processing plural times, the image analysis unit 38 can output information, which is obtained before and after a change in the position of the user, to the position information acquisition unit 32 if the position of the user is changed.

The position information acquisition unit 32 generates position information, which represents the position of the user, on the basis of the information acquired from the image analysis unit 38. That is, the position information acquisition unit 32 is to generate position information, which represents the position of the user, on the basis of the direction where the user is present around the image forming apparatus 1 and the distance L between the image forming apparatus 1 and the user. Then, the position information acquisition unit 32 outputs the position information to the movement direction detection unit 36. In a case where the position information acquisition unit 32 repeats this processing plural times, the position information acquisition unit 32 can output information, which is obtained before and after a change in the position of the user, to the movement direction detection unit 36 if the position of the user is changed.

The movement direction detection unit 36 is a processing unit that detects the movement direction of the user on the basis of the position information of the user acquired from the position information acquisition unit 32. The movement direction detection unit 36 determines whether or not the position of the user is changed on the basis of at least two pieces of position information that are output from the position information acquisition unit 32 at certain time intervals. That is, the movement direction detection unit 36 determines that the user is moving in a case where the two or more pieces of position information are different information. Then, the movement direction detection unit 36 detects the movement direction of the user on the basis of the position information of the user before movement and the position information of the user after movement. After that, the movement direction detection unit 36 outputs information, which represents the movement direction of the user, to the output mode determination unit 33.

The output mode determination unit 33 determines the output mode of a printed matter on the basis of the movement direction of the user detected by the movement direction detection unit 36 and the position information of the user. For example, in a case where the user moves even after an area where the user is positioned is specified on the basis of the position information of the user at a certain point of time, it is thought that the user moves to another area. For this reason, the output mode determination unit 33 determines the output mode of a printed matter on the basis of not only the position information of the user but also the movement direction of the user. That is, the output mode determination unit 33 does not determine the output mode of a printed matter on the basis of the current position of the user, and is to predict the position of the user, when the user will come close to the image forming apparatus 1 to acquire a printed matter, and to determine the output mode of a printed matter on the basis of the predicted position of the user.

Figure 12:
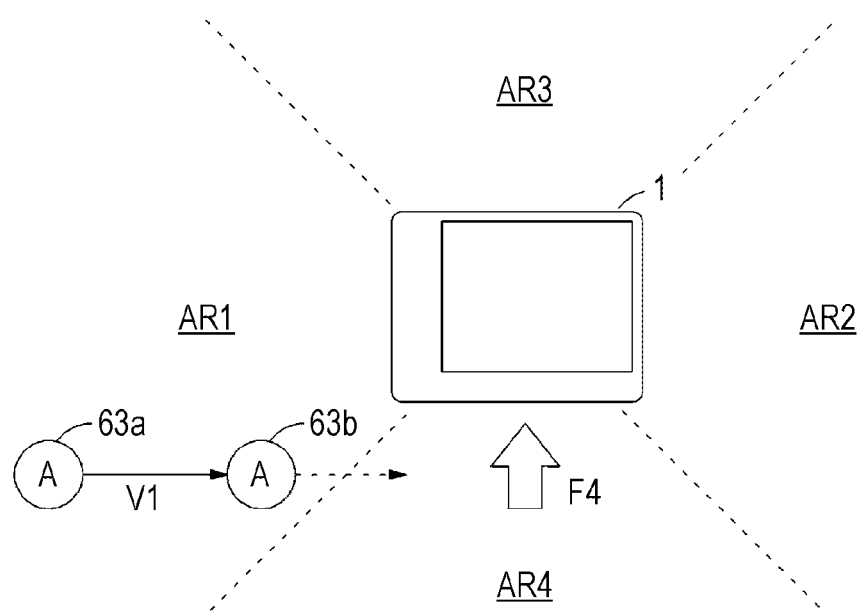
FIG. 12 is a diagram illustrating an example of the output mode of a printed matter that is determined by an output mode determination unit of the third embodiment.

FIG. 12 is a diagram illustrating an example of a method of determining the output mode of a printed matter in consideration of the movement direction of the user. For example, in a case where a user A inputting a print job moves to a second position 63b from a first position 63a as illustrated in FIG. 12, the current position 63b of the user A is included in one area AR1 of the four areas AR1 to AR4. However, if the user A moves forward in the same movement direction (a direction of an arrow V1 illustrated in FIG. 12) as it is, the user A moves to the other area AR4 when arriving near the image forming apparatus 1. For this reason, there is a possibility that the user A may acquire a printed matter in the direction of an arrow F4. Accordingly, the output mode determination unit 33 determines whether or not there is a possibility that the user may move to the other area from the current area on the basis of the movement direction of the user; and determines an output mode corresponding to the other area in a case where there is a possibility that the user may move to the other area. In this case, the print-out unit 34 outputs the printed matter D4 of the fourth output mode. For this reason, in a case where a user is to acquire the printed matter D4 in the direction indicated by the arrow F4, the user can acquire the printed matter D4 in a state where the orientation of the printed matter faces the front.

Figure 13A:
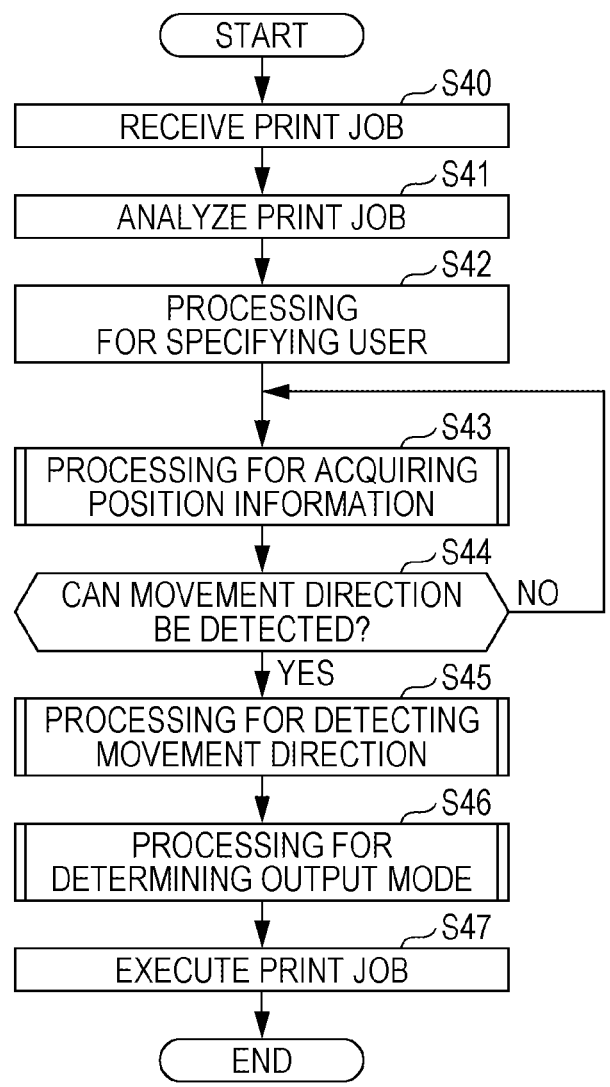
FIGS. 13A and 13B are flowcharts illustrating examples of the procedures of processing performed in the image forming apparatus of the third embodiment.

Next, an example of the specific operation of the image forming apparatus 1 of this embodiment will be described. FIGS. 13A and 13B and FIGS. 14A and 14B are flowcharts illustrating examples of the procedures of processing performed in the image forming apparatus 1. FIG. 13A is a flowchart illustrating an example of the procedure of main processing performed in the image forming apparatus 1. This processing is processing that is started when the image forming apparatus 1 receives a print job. Steps S40 to S42 of FIG. 13A are the same as steps S1 to S3 of FIG. 5A. That is, when the image forming apparatus 1 receives a print job (step S40), the image forming apparatus 1 analyzes the print job (step S41) and specifies the user inputting the print job (step S42). Subsequently, the image forming apparatus 1, which has specified the user inputting the print job, performs processing for acquiring position information (step S43).

Figure 13B:
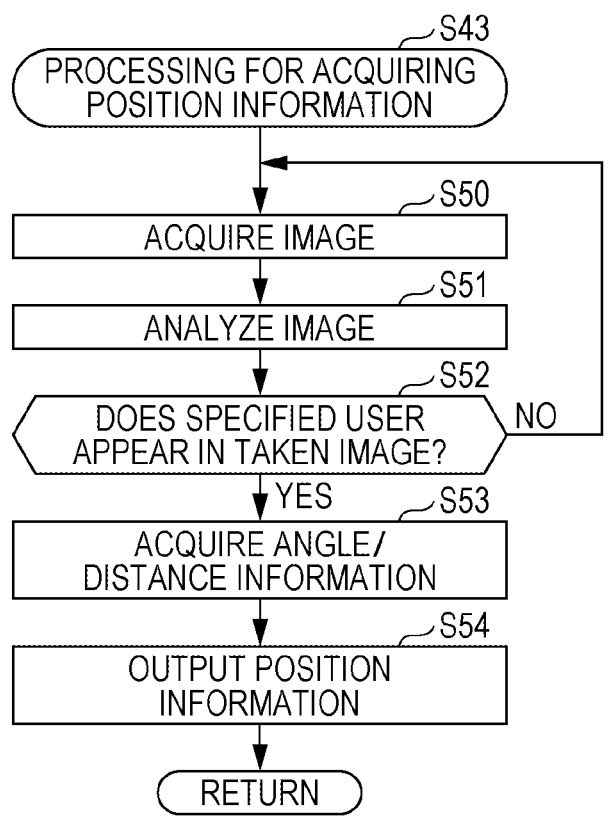

FIG. 13B is a flowchart illustrating an example of the detailed procedure of the processing for acquiring position information (step S43). When the image forming apparatus 1 starts the processing for acquiring position information, the image forming apparatus 1 causes the image acquisition unit 37 to function to acquire a taken image, which is taken by the camera 4, of an area around the image forming apparatus 1 (step S50). After that, the image forming apparatus 1 causes the image analysis unit 38 to function to analyze the taken image (step S51) and determines whether or not the user inputting the print job appears in the taken image (step S52). If the user inputting the print job does not appear in the taken image (NO in step S52), the processing performed by the image forming apparatus 1 returns to step S50. On the other hand, if the user inputting the print job appears in the taken image (YES in step S52), the image analysis unit 38 acquires the distance between the user and the image forming apparatus 1 and a direction where the user is positioned (step S53). After that, the position information acquisition unit 32 generates position information, which represents the position of the user, on the basis of the distance between the user inputting the print job and the image forming apparatus 1 and the direction where the user is positioned; and outputs the position information to the output mode determination unit 33 and the movement direction detection unit 36 (step S54). The processing for acquiring position information (step S43) ends with this.

Returning to FIG. 13A, the image forming apparatus 1 then causes the movement direction detection unit 36 to function to determine whether or not the movement direction of the user can be detected (step S44). If the movement direction cannot be detected from a change in position information (NO in step S44) since only one piece of the position information of the user can be acquired, the processing performed by the image forming apparatus 1 returns to step S43. On the other hand, if the movement direction can be detected from a change in position information (YES in step S44) since a plurality of pieces of the position information of the user can be acquired, the movement direction detection unit 36 performs processing for detecting the movement direction (step S45).

Figure 14A:
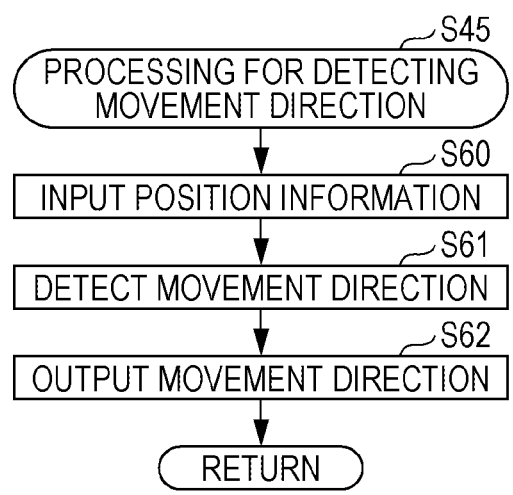
FIGS. 14A and 14B are flowcharts illustrating examples of the procedures of processing performed in the image forming apparatus of the third embodiment.

FIG. 14A is a flowchart illustrating an example of the detailed procedure of the processing for detecting the movement direction (step S45). When the movement direction detection unit 36 starts the processing for detecting the movement direction, the movement direction detection unit 36 acquires position information from the position information acquisition unit 32 (step S60). After that, the movement direction detection unit 36 compares position information input at a previous time with position information input at this time to detect the movement direction of the user inputting the print job (step S61). The movement direction detection unit 36 outputs the detected movement direction to the output mode determination unit 33 (step S62). The processing for detecting the movement direction (step S45) ends with this.

Returning to FIG. 13A again, the image forming apparatus 1 then causes the output mode determination unit 33 to function to perform processing for determining the output mode (step S46).

Figure 14B:
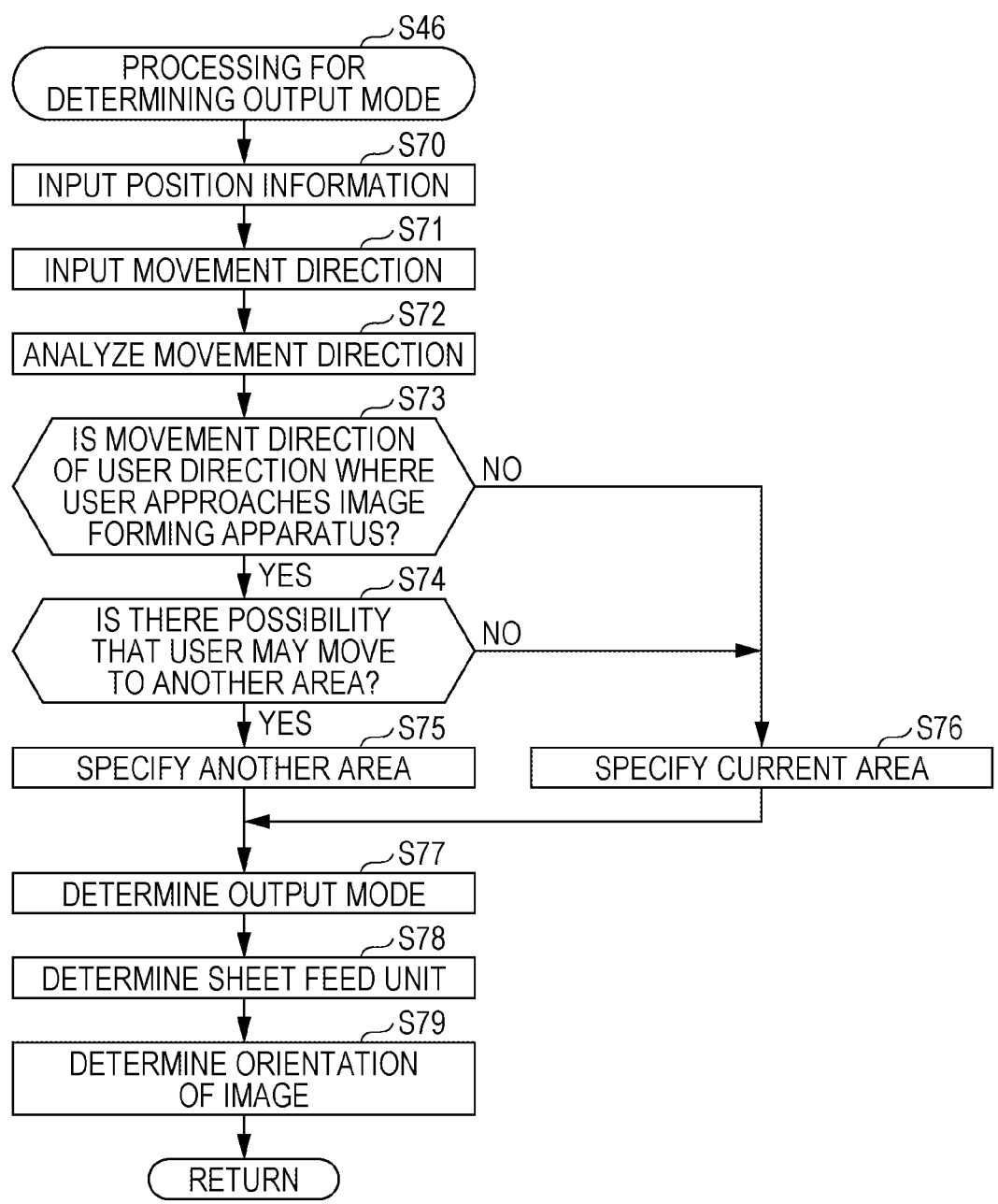

FIG. 14B is a flowchart illustrating an example of the detailed procedure of the processing for determining the output mode (step S46). When the output mode determination unit 33 starts the processing for determining the output mode, the output mode determination unit 33 acquires the position information of the user from the position information acquisition unit 32 (step S70). After that, the movement direction of the user is input to the output mode determination unit 33 from the movement direction detection unit 36 (step S71). The output mode determination unit 33 analyzes the movement direction of the user (step S72), and checks whether or not the movement direction of the user is a direction where the user approaches the image forming apparatus 1 (step S73). If the movement direction of the user is not a direction where the user approaches the image forming apparatus 1 (NO in step S73), the processing performed by the image forming apparatus 1 proceeds to step S76.

On the other hand, if the movement direction of the user is a direction where the user approaches the image forming apparatus 1 (YES in step S73), the output mode determination unit 33 determines whether or not there is a possibility that the user may move to the other area (step S74). That is, the output mode determination unit 33 is to determine whether or not the position of the user is moved to the other area from the current area in a case where the current position of the user is moved in the movement direction as it is. If there is no possibility that the user may move to the other area (NO in step S74), the output mode determination unit 33 specifies an area, which includes the current position of the user, among the four areas AR1 to AR4 (step S76).

In contrast, if there is a possibility that the user may move to the other area hereafter (YES in step S74), the output mode determination unit 33 specifies the other area that is the destination of the user (step S75). If one area is specified in step S75 or S76, the output mode determination unit 33 determines any one output mode of the first to fourth output modes as the output mode of a printed matter according to the specified area (step S77). Then, the output mode determination unit 33 determines one sheet feed unit 16, which is to feed printing sheets, among the plurality of sheet feed units 16 on the basis of the determined output mode (step S78). In addition, the output mode determination unit 33 determines the rotation angle of the image, which is required at the time of formation of the image, on the basis of the determined output mode (step S79). At this time, any one of 0°, 90°, 180°, and 270° is determined as the rotation angle of the image according to the output mode of a printed matter. The processing for determining the output mode (step S46) ends with this.

Returning to FIG. 13A again, the image forming apparatus 1 causes the print-out unit 34 to function to execute the print job (step S47). At this time, the print-out unit 34 performs the same processing as the processing described in the first embodiment. A printed matter of the output mode determined by the output mode determination unit 33 is output onto the sheet discharge tray 3 by the execution of the print job.

When the image forming apparatus 1 of this embodiment receives a print job, as described above, the image forming apparatus 1 acquires the taken image of an area around the image forming apparatus 1, specifies the position of the user inputting the print job on the basis of the taken image, and determines the output mode of a printed matter. Further, the image forming apparatus 1 of this embodiment can also detect the movement direction of the user and determine the output mode of a printed matter on the basis of the movement direction. Accordingly, the image forming apparatus 1 of this embodiment can output a printed matter in an appropriate output mode as in the respective embodiments having been described above.

Meanwhile, this embodiment is the same as the first or second embodiment except for the point described above in this embodiment. For this reason, the image forming apparatus 1 of this embodiment has the same effects as that of the first or second embodiment.

Fourth Embodiment

Next, a fourth embodiment of the present disclosure will be described. One aspect where an image forming apparatus 1 is connected to a server managing the current positions of users and acquires the position information of the users from the server will be described in this embodiment.

Figure 15:
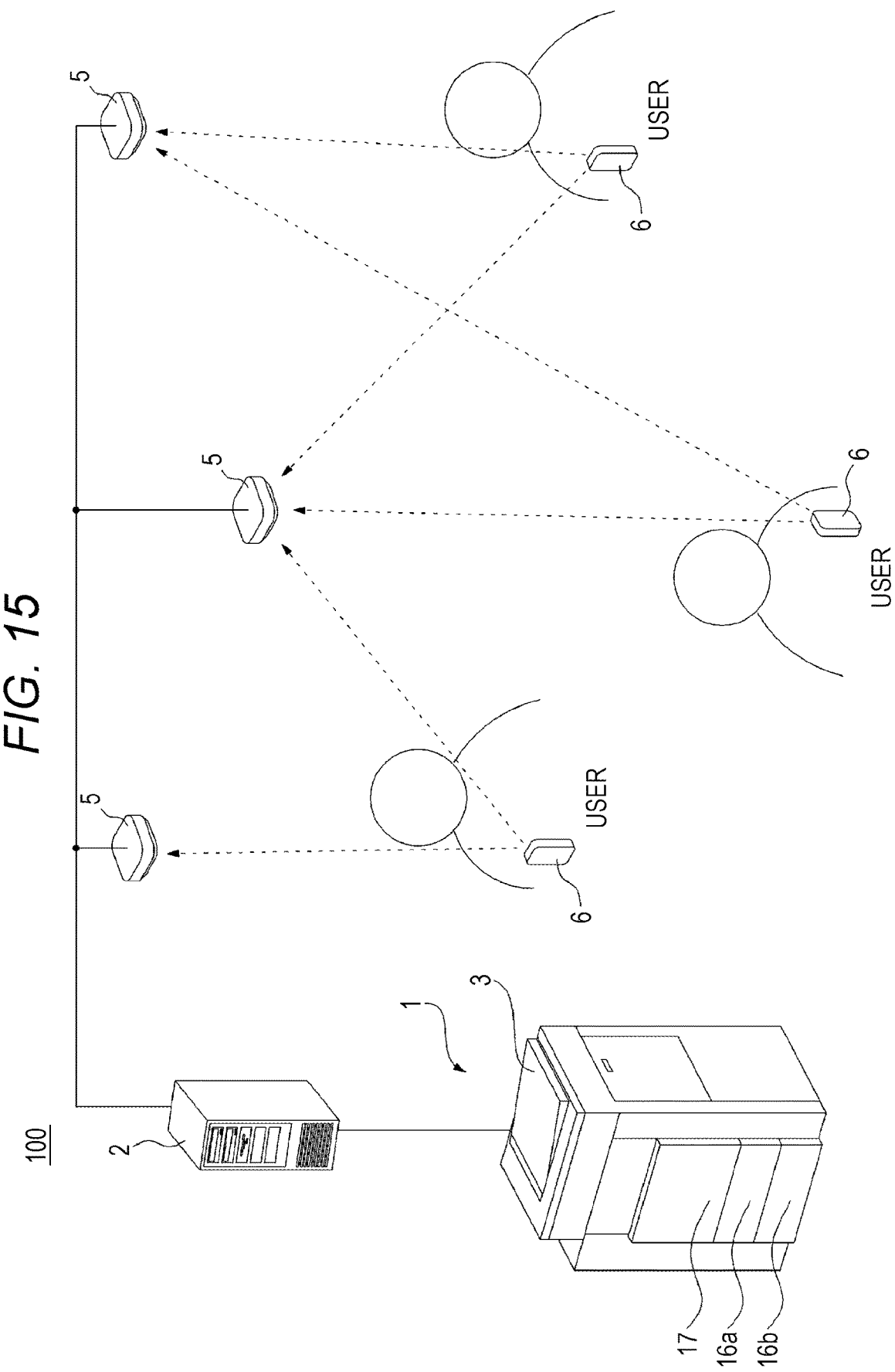
FIG. 15 is a diagram illustrating an example of the conceptual configuration of an image forming system of a fourth embodiment.

FIG. 15 is a diagram illustrating an example of the conceptual configuration of an image forming system 100 of this embodiment. The image forming system 100 is a network system that is installed in, for example, an office or the like; and includes a server 2, an image forming apparatus 1, a plurality of beacon receivers 5, and a plurality of beacon transmitters 6.

The beacon transmitters 6 are devices that are worn and carried by the bodies of a plurality of users permitted to enter an office or the like. The beacon transmitters 6 store user identification information used to identify the respective users, and output the user identification information as radio waves. The radio waves emitted from the beacon transmitters 6 have the intensity of radio waves that can be received by the beacon receivers 5 positioned around the beacon transmitters 6 within the range of a predetermined distance.

The beacon receivers 5 are installed at a plurality of positions on, for example, the ceiling, the walls, or the like of the office, and receive radio waves sent from the beacon transmitters 6 possessed by the respective users. When the beacon receivers 5 receive the radio waves output from the beacon transmitters 6, the beacon receivers 5 detect user identification information from radio wave signals. Further, when the beacon receivers 5 receive the radio waves output from the beacon transmitters 6, the beacon receivers 5 detect the intensities of the radio waves. In a case where the beacon receivers 5 are two dimensionally arranged on, for example, the ceiling surface or the like of the office at predetermined intervals, the positions of the users can be specified with high accuracy by the intensities of the radio waves received by the respective beacon receivers 5.

Each of the beacon receivers 5 is connected to the server 2. When the beacon receivers 5 receive the radio waves output from the beacon transmitters 6 and detect the user identification information and the intensities of the radio waves, the beacon receivers 5 output the user identification information and the intensities of the radio waves to the server 2. Meanwhile, the beacon receivers 5 can also simultaneously receive the radio waves output from the plurality of beacon transmitters 6.

The server 2 is a device that manages the current positions of the respective users present in the office on the basis of the user identification information and the intensities of radio waves output from the plurality of beacon receivers 5. Installation position information, which represents the installation positions of the plurality of beacon receivers 5 in the office, is registered in the server 2 in advance. For this reason, the server 2 can specify the current positions of the respective users in the office on the basis of the user identification information and the intensities of radio waves received from the plurality of beacon receivers 5. Further, when the respective users move in the office, the server 2 can grasp the movement of the users in real time and update the current positions of the users. The server 2 manages the user identification information and the current position information in association with each other, and notifies the image forming apparatus 1 of the current position information of each user according to a request from the image forming apparatus 1.

The image forming apparatus 1 is connected to the server 2 so as to be capable of communicating with the server 2. The mode of communication between the image forming apparatus 1 and the server 2 may be any one of wire communication and wireless communication. Further, the image forming apparatus 1 communicates with the server 2 to acquire the position information of the user inputting the print job.

When the image forming apparatus 1 receives a print job input by a user, the image forming apparatus 1 specifies the user inputting the print job. In a case where the image forming apparatus 1 can specify the user inputting the print job, the image forming apparatus 1 communicates with the server 2 and acquires the position information of the user inputting the print job. Then, when the image forming apparatus 1 acquires the position information of the user inputting the print job, the image forming apparatus 1 determines the output mode of a printed matter on the basis of the position information and outputs the printed matter in the determined output mode.

Figure 16:
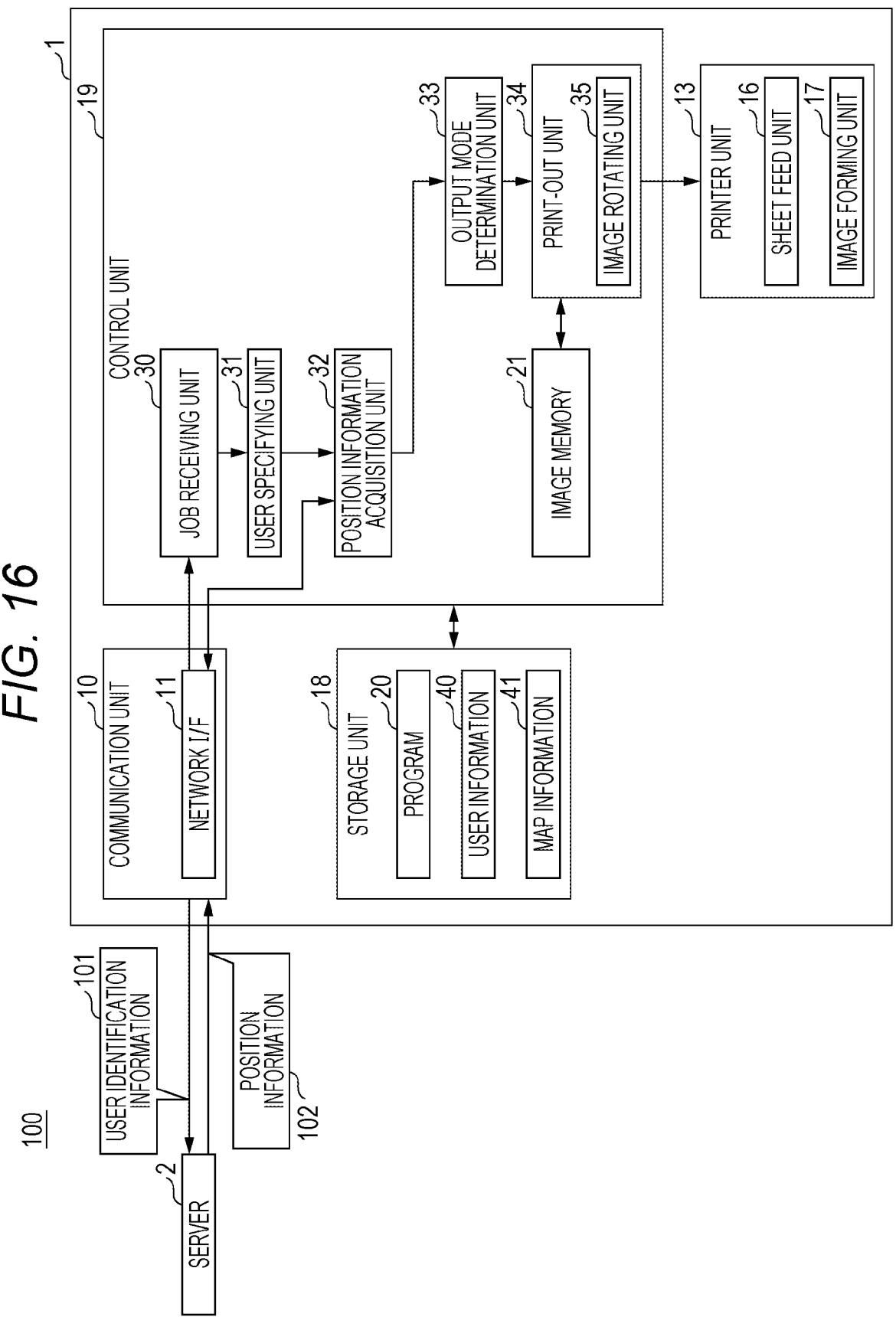
FIG. 16 is a diagram illustrating an example of hardware components and functional components of the image forming system of the fourth embodiment.

FIG. 16 is a block diagram illustrating an example of configuration of the image forming system 100 of this embodiment, and is a diagram mainly illustrating the configuration of the image forming apparatus 1. The image forming apparatus 1 of this embodiment includes a communication unit 10, a printer unit 13, a storage unit 18, and a control unit 19 as in the respective embodiments having been described above. The control unit 19 communicates with the server 2 through the communication unit 10.

The control unit 19 includes a CPU and a memory (not illustrated), and includes an image memory 21. The CPU of the control unit 19 executes a program 20, so that the control unit 19 functions as a job receiving unit 30, a user specifying unit 31, a position information acquisition unit 32, an output mode determination unit 33, and a print-out unit 34.

When the print job is received by the job receiving unit 30 and the user inputting the print job is specified by the user specifying unit 31, the position information acquisition unit 32 of this embodiment communicates with the server 2 through the communication unit 10 to acquire position information 102 of the user inputting the print job. Specifically, the position information acquisition unit 32 reads user identification information 101 about the user inputting the print job from the user information 40, and sends the user identification information 101 to the server 2.

As described above, the server 2 manages the current positions of all users who are permitted to enter the office or the like in real time. When the server 2 receives the user identification information 101 from the image forming apparatus 1, the server 2 reads the position information 102 representing the current position of the user corresponding to the user identification information 101 and sends the position information 102 to the image forming apparatus 1. Accordingly, the position information acquisition unit 32 can acquire the position information 102 of the user inputting the print job from the server 2.

The position information 102, which is acquired from the server 2 by the position information acquisition unit 32, is information represented by the coordinate space of the office managed by the server 2, and does not necessarily match a position on a floor map of the office managed by the image forming apparatus 1. For this reason, when the position information acquisition unit 32 acquires the position information 102 of the user from the server 2, the position information acquisition unit 32 converts the position information 102 so that the position information 102 becomes position information matching the position on the floor map of the office managed by the image forming apparatus 1. Accordingly, the position information 102 acquired from the server 2 is converted into position information based on the installation position of the image forming apparatus 1. Then, the position information acquisition unit 32 outputs the converted position information to the output mode determination unit 33.

Figure 17A:
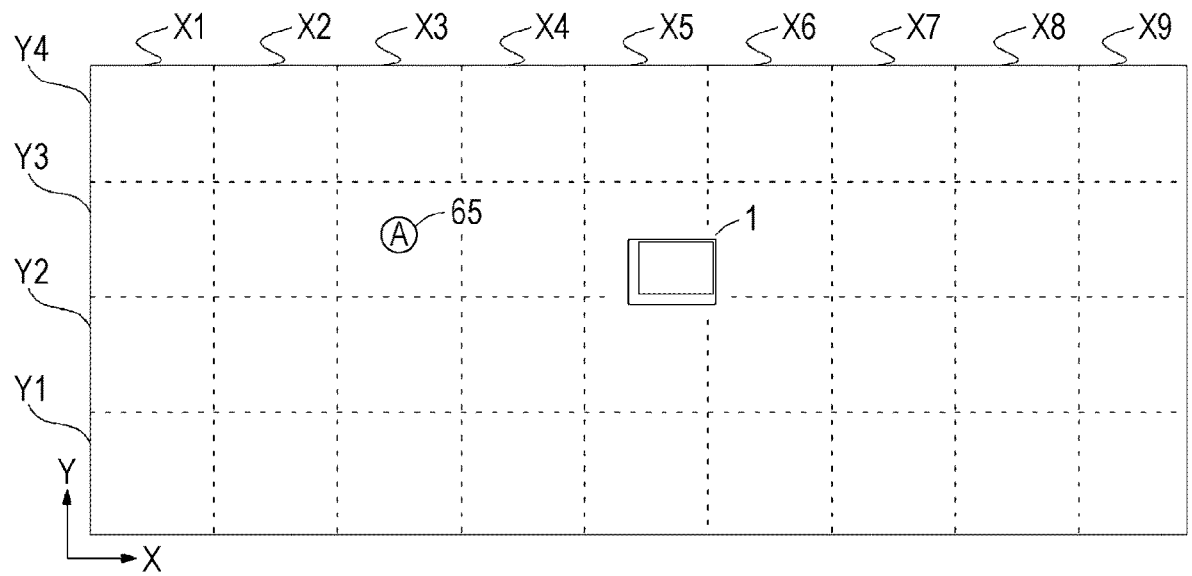
FIGS. 17A and 17B are diagrams illustrating examples of the output modes of a printed matter that are determined by an output mode determination unit of the fourth embodiment.
Figure 17B:
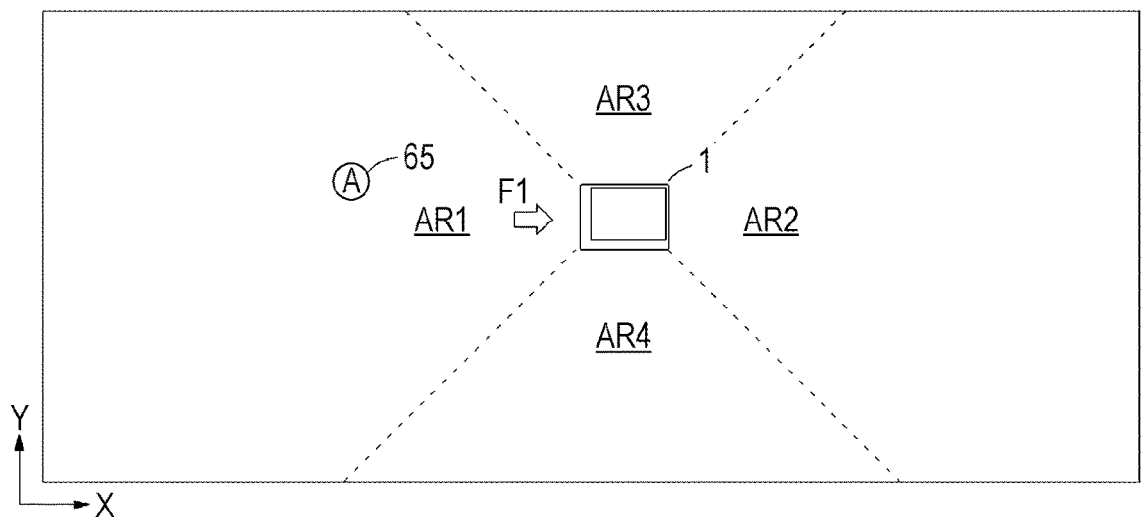

FIGS. 17A and 17B are diagrams illustrating the summary of processing for converting the position information 102 that is performed by the position information acquisition unit 32. FIG. 17A illustrates the position of a user A that is represented by the position information 102 acquired from the server 2. For example, 36 beacon receivers 5 in total, which are arranged in the form of a matrix where nine beacon receivers 5 are arranged in an X direction and four beacon receivers 5 are arranged in a Y direction, are arranged in the space of the office as illustrated in FIG. 17A. In this case, the server 2 manages the space of the office as 36 divided areas, and grasps an area where each user is positioned among the 36 areas in real time. For this reason, the position information 102, which is acquired from the server 2 by the position information acquisition unit 32, is information representing an area where a user is present among the 36 areas. In the case of FIG. 17A, information representing coordinates (X3, Y3) is obtained as the position information 102 that represents the position of the user A.

In a case where the position information 102 illustrated in FIG. 17A is obtained, the position information acquisition unit 32 maps the position information 102 to the floor map that is managed by the image forming apparatus 1. Accordingly, the position information 102 acquired from the server 2 is converted into position information based on the installation position of the image forming apparatus 1. As a result, as illustrated in FIG. 17B, position information representing a position where the user A is present around the image forming apparatus 1 is obtained on the basis of the installation position of the image forming apparatus 1.

Meanwhile, in a case where the coordinate space of the office managed by the server 2 matches the coordinate space of the floor map of the office managed by the image forming apparatus 1 in advance, the above-mentioned processing for converting the position information 102 is not necessary. In this case, the position information acquisition unit 32 may output the position information 102, which is acquired from the server 2, to the output mode determination unit 33 as it is.

The output mode determination unit 33 determines the output mode of a printed matter on the basis of the position information of the user that is output from the position information acquisition unit 32. The methods described in the respective embodiments having been described above can be employed as a method of determining the output mode. Accordingly, one output mode of the first to fourth output modes is determined.

For example, the output mode determination unit 33 can specify an area where the user is present among the plurality of areas AR1 to AR4 on the basis of the position information of the user as described in the first embodiment, and can determine the output mode of a printed matter on the basis of the specified area. However, the present disclosure is not limited thereto, and, as described in the third embodiment, the output mode determination unit 33 may detect the movement direction of the user, specify an area as the destination of the user on the basis of the movement direction, and determine the output mode of a printed matter on the basis of the specified area.

Next, an example of the specific operation of the image forming apparatus 1 of this embodiment will be described. The procedure of main processing performed by the image forming apparatus 1 is the same as that of the flowchart illustrated in FIG. 5A. However, the detail of the processing of step S4 illustrated in FIG. 5A in this embodiment is different from that in the first embodiment. For this reason, the detail of processing for acquiring position information (step S4) of this embodiment will be described.

Figure 18:
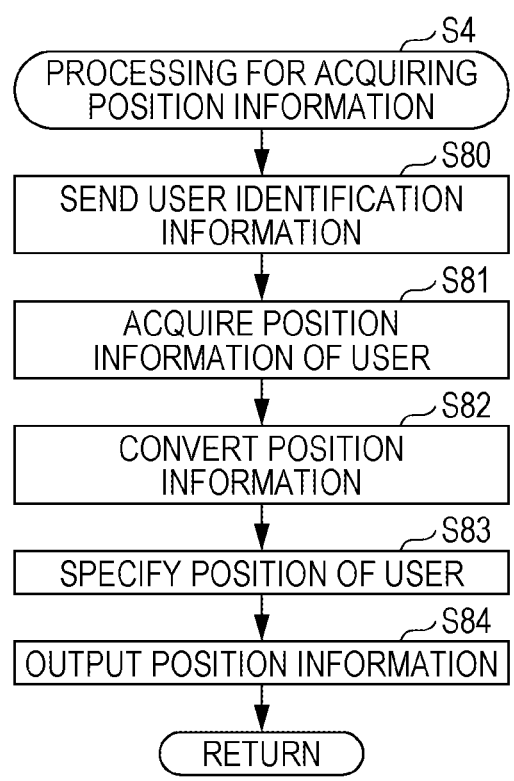
FIG. 18 is a flowchart illustrating an example of the procedure of processing performed in an image forming apparatus of the fourth embodiment.

FIG. 18 is a flowchart illustrating an example of the detailed procedure of the processing for acquiring position information (step S4). When the position information acquisition unit 32 starts the processing for acquiring position information, the position information acquisition unit 32 reads user identification information 101 about the user inputting the print job from the user information 40 and sends the user identification information 101 to the server 2 (step S80). Accordingly, the position information acquisition unit 32 acquires the position information 102 of the user inputting the print job from the server 2 (step S81). The position information acquisition unit 32 maps the position information 102 to the coordinate system of the floor map managed by the image forming apparatus 1 to convert the position information 102 into position information that is based on the installation position of the image forming apparatus 1. After that, the position information acquisition unit 32 outputs the position information, which represents the position of the user, to the output mode determination unit 33 (step S84). The processing for acquiring position information (step S4) ends with this.

When the image forming apparatus 1 of this embodiment receives a print job, as described above, the image forming apparatus 1 of this embodiment specifies the user inputting the print job and acquires the position information 102 of the specified user from the server 2 to acquire the position information of the user. Then, the image forming apparatus 1 determines the output mode of a printed matter on the basis of the position of the user and executes the print job. Accordingly, the image forming apparatus 1 can output a printed matter in an appropriate output mode according to the position of the user who inputs the job.

Further, the image forming apparatus 1 of this embodiment can acquire the position information 102 of the user from the server 2 plural times. For this reason, in a case where the image forming apparatus 1 acquires the position information 102 of the user plural times as described in the third embodiment and the position of the user is changed, the image forming apparatus 1 can detect the movement direction of the user. For this reason, the image forming apparatus 1 may predict an area as the destination of the user and determine an output mode on the basis of the result of the prediction. In this case, even though a user moves across a plurality of areas to approach the image forming apparatus 1, the user can acquire a printed matter of which the front faces oneself.

Further, in this embodiment, a method including possessing the beacon transmitters 6 by the plurality of users, respectively, installing the beacon receivers 5 on the ceiling, the walls, or the like of the office, and specifying the current positions of the respective users by the server 2 on the basis of the user identification information and the intensities of radio waves output from the plurality of beacon receivers 5 has been exemplified as one method of acquiring the current positions of a plurality of users by the server 2. However, the method of acquiring the current positions of a plurality of users by the server 2 is not limited thereto, and may include, for example, installing the plurality of beacon transmitters 6 on the ceiling, the walls, or the like of the office, receiving radio waves from the respective beacon transmitters 6 by portable terminals possessed by the plurality of users to specify the current positions of the portable terminals in the office, and sending the specified current positions to the server 2. According to this configuration, since the current positions of the respective users do not need to be specified in the server 2, the processing efficiency of the server 2 is improved.

Meanwhile, this embodiment is the same as the first to third embodiments except for the point described above in this embodiment. For this reason, the image forming apparatus 1 of this embodiment has the same effects as those of the first to third embodiments.

Fifth Embodiment

Next, a fifth embodiment of the present disclosure will be described. One aspect where an image forming apparatus 1 starts to execute a print job in a case where the image forming apparatus 1 detects a user present in a predetermined area around itself will be described in this embodiment.

The image forming apparatuses 1 of the first to fourth embodiments have started to execute a print job as the output mode of a printed matter is determined by the output mode determination unit 33. In contrast, the image forming apparatus 1 of this embodiment starts to execute a print job in a case where a user present in an area within the range of a predetermined distance around the image forming apparatus 1 is detected. For example, this image forming apparatus 1 can prevent a printed matter from being left on a sheet discharge tray 3 in a case where a user inputting the print job does not immediately acquire the printed matter, or the like. Further, since the image forming apparatus 1 can determine the output mode of a printed matter on the basis of the position information of a user after the user approaches the image forming apparatus 1, the image forming apparatus 1 can more reliably output a printed matter in the front direction of the user.

Figure 19A:
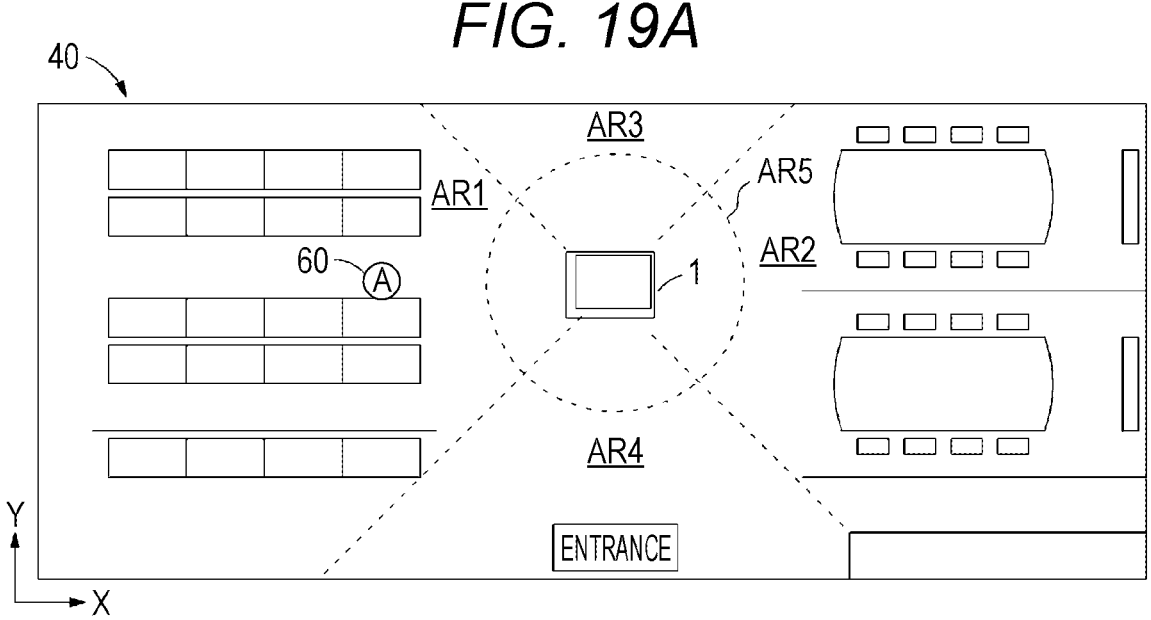
FIGS. 19A and 19B are diagrams illustrating an example of the execution timing of a print job of a fifth embodiment.
Figure 19B:
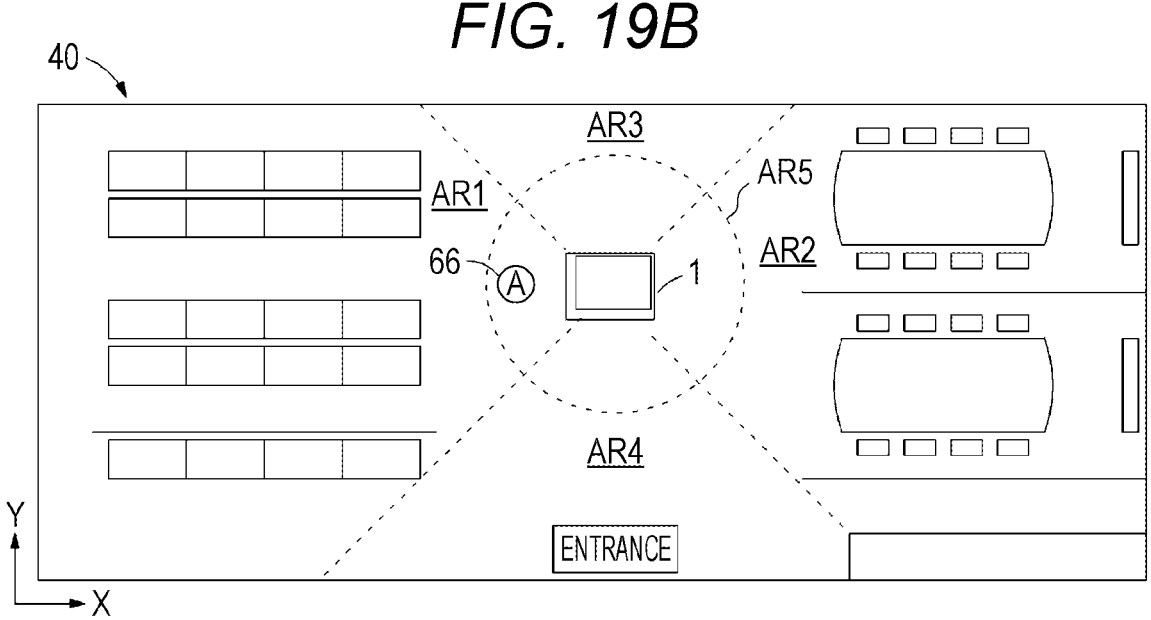

FIGS. 19A and 19B are diagrams illustrating an example of the execution timing of a print job in the image forming apparatus 1 of this embodiment. For example, an area AR5 within the range of a predetermined distance is preset around the image forming apparatus 1 as illustrated in FIG. 19A. When the image forming apparatus 1 detects that the user inputting the print job enters the area AR5, the image forming apparatus 1 starts to execute the print job.

For example, in a case where a user A inputting a print job is present at a position 60 outside the area AR5 as illustrated in FIG. 19A when the image forming apparatus 1 receives the print job, the image forming apparatus 1 does not immediately start to execute the print job. That is, a job receiving unit 30 stores the received print job in a storage unit 18 and manages the execution of the print job as a suspended state.

After that, when the image forming apparatus 1 detects the movement of the user and detects that the user A inputting the print job moves to a position 66 inside the area AR5 as illustrated in FIG. 19B, the image forming apparatus 1 reads the print job of the user A from the storage unit 18 and executes the print job of the user A. At this time, the image forming apparatus 1 specifies an area where the user A is present among four areas AR1 to AR4, determines an output mode corresponding to the specified area, and executes the print job.

This image forming apparatus 1 includes a detector detecting whether or not a user is present in the predetermined area AR5 around the image forming apparatus 1 in addition to the components of the image forming apparatus 1 described in any one embodiment of the first to fourth embodiments.

Figure 20:
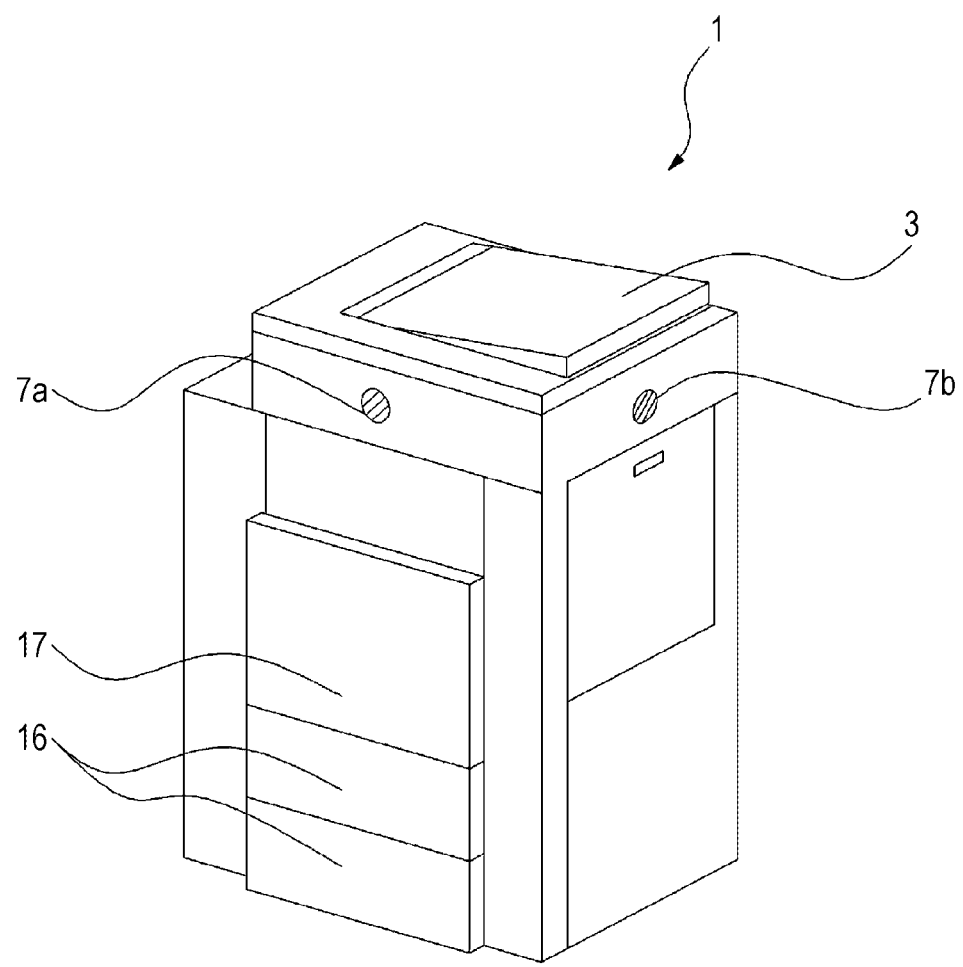
FIG. 20 is a perspective view illustrating an example of the appearance of an image forming apparatus of the fifth embodiment.

FIG. 20 is a diagram illustrating an example of the appearance of the image forming apparatus 1 of this embodiment. The image forming apparatus 1 includes human body detection sensors 7a to 7d that are provided on four side surfaces of the image forming apparatus 1, respectively. However, the human body detection sensors 7c and 7d are not illustrated in FIG. 20. The human body detection sensors 7a to 7d are sensors that are used to detect users present in a predetermined area AR5 in the respective directions. Each of the human body detection sensors 7a to 7d is formed of, for example, an infrared sensor and can detect a user who is present within the range of a predetermined distance.

However, in a case where the technique described in the third or fourth embodiment is applied, the image forming apparatus 1 can acquire the position of a user approaching itself in real time. For this reason, the image forming apparatus 1 to which the technique described in the third or fourth embodiment is applied can also detect whether or not a user is present in the predetermined area AR5 without being particularly provided with the above-mentioned human body detection sensors 7a to 7d. Meanwhile, a case where users are detected using the plurality of human body detection sensors 7a to 7d will be mainly exemplified below.

Figure 21A:
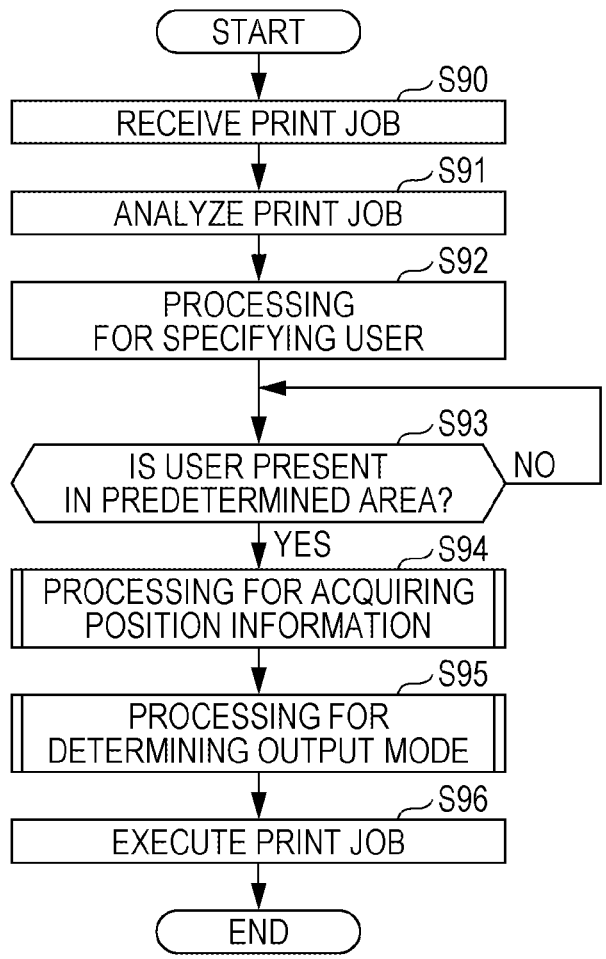
FIGS. 21A and 21B are flowcharts illustrating examples of the procedures of processing performed in the image forming apparatus of the fifth embodiment.
Figure 21B:
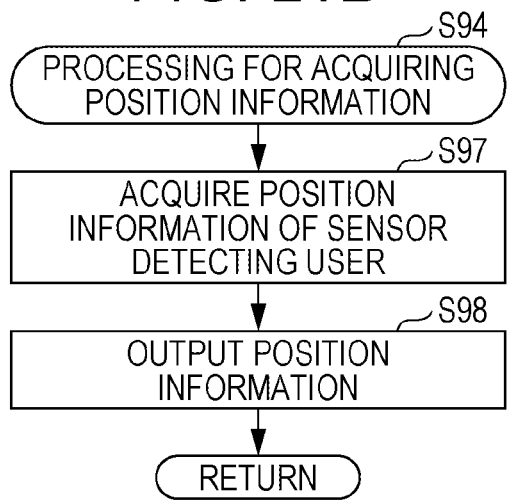

Next, an example of the specific operation of the image forming apparatus 1 of this embodiment will be described. FIGS. 21A and 21B are flowcharts illustrating examples of the procedures of processing performed in the image forming apparatus 1. First, FIG. 21A is a flowchart illustrating an example of the procedure of main processing performed by the image forming apparatus 1. The processing illustrated in FIG. 21A is processing that is started when the image forming apparatus 1 receives a print job. Steps S90 to S92 of FIG. 21A are the same as steps S1 to S3 of FIG. 5A. That is, when the image forming apparatus 1 receives the print job (step S90), the image forming apparatus 1 analyzes the print job (step S91) and specifies a user inputting the print job (step S92).

After that, the image forming apparatus 1 determines whether or not a user is present in the predetermined area AR5 (step S93). That is, the image forming apparatus 1 determines whether any one of the plurality of human body detection sensors 7a to 7d detects a user. If a user is not present in the predetermined area AR5 (NO in step S93), the image forming apparatus 1 repeats the processing of step S93 until a user is detected in the predetermined area AR5. On the other hand, if a user is present in the predetermined area AR5 (YES in step S93), the image forming apparatus 1 causes the position information acquisition unit 32 to perform processing for acquiring position information (step S94).

FIG. 21B is a flowchart illustrating an example of the detailed procedure of the processing for acquiring position information (step S94) performed by the position information acquisition unit 32. When the position information acquisition unit 32 starts the processing for acquiring position information, the position information acquisition unit 32 specifies a sensor, which detects a user, among the plurality of human body detection sensors 7a to 7d and acquires position information corresponding to a position where the specified sensor is provided (step S97). That is, the position where the sensor detecting the user is provided is acquired as position information that represents the position of the user. Then, the position information acquisition unit 32 outputs the position information, which represents the position of the user, to the output mode determination unit 33. The processing for acquiring position information (step S94) ends with this.

Meanwhile, in a case where the technique described in the third embodiment is applied, the image forming apparatus 1 may be adapted to perform the processing for acquiring position information (step S43) illustrated in FIG. 13B as the processing for acquiring position information (step S94) illustrated in FIG. 21A. That is, the image forming apparatus 1 may be adapted to acquire the position information of the user from an image that is taken by the camera 4. Further, in a case where the technique described in the fourth embodiment is applied, the image forming apparatus 1 may be adapted to perform the processing for acquiring position information (step S43) illustrated in FIG. 18 as the processing for acquiring position information (step S94) illustrated in FIG. 21A. That is, the image forming apparatus 1 may be adapted to acquire the position information of the user from the server 2.

Returning to FIG. 21A, the image forming apparatus 1 causes the output mode determination unit 33 to function to perform processing for determining an output mode (step S95). Since this processing is the same processing as the processing for determining the output mode (step S5) of FIG. 5C described in the first embodiment, the description thereof will be omitted. After that, the image forming apparatus 1 causes the print-out unit 34 to function to execute the print job (step S96). At this time, the print-out unit 34 outputs a printed matter of an output mode determined by the output mode determination unit 33. The image forming apparatus 1 ends the processing associated with the reception of the print job when the execution of the print job is completed.

As described above, the image forming apparatus 1 of this embodiment starts to execute the print job in a case where it is detected that the user is present in the predetermined area AR5 around the image forming apparatus 1. For this reason, the image forming apparatus 1 can prevent a printed matter from being left on the sheet discharge tray 3 in a case where the user inputting the print job does not immediately acquire the printed matter, or the like. Further, the image forming apparatus 1 can determine the output mode of a printed matter on the basis of the position information of the user at the point of time when the user approaches the image forming apparatus 1, and outputs the printed matter. Accordingly, the image forming apparatus 1 can more reliably output a printed matter in the front direction of the user.

Meanwhile, this embodiment is the same as the first to fourth embodiments except for the point described above in this embodiment. For this reason, the image forming apparatus 1 of this embodiment has the same effects as those of the first to fourth embodiments.

Sixth Embodiment

Next, a sixth embodiment of the present disclosure will be described. A case where the print job starts to be executed in the image forming apparatus 1 when a user approaches the image forming apparatus 1 has been exemplified in the above-mentioned fifth embodiment. However, if a printed matter starts to be output at a time when a user approaches the image forming apparatus 1 in a case where the number of printing sheets to be output by a print job is large, the user is caused to wait beside the image forming apparatus 1 until the completion of the execution of the print job. For this reason, this is not preferable. Accordingly, one aspect where an image forming apparatus 1 is adapted to determine the output mode of a printed matter on the basis of the history of the past output mode under predetermined conditions will be described in this embodiment.

Figure 22:
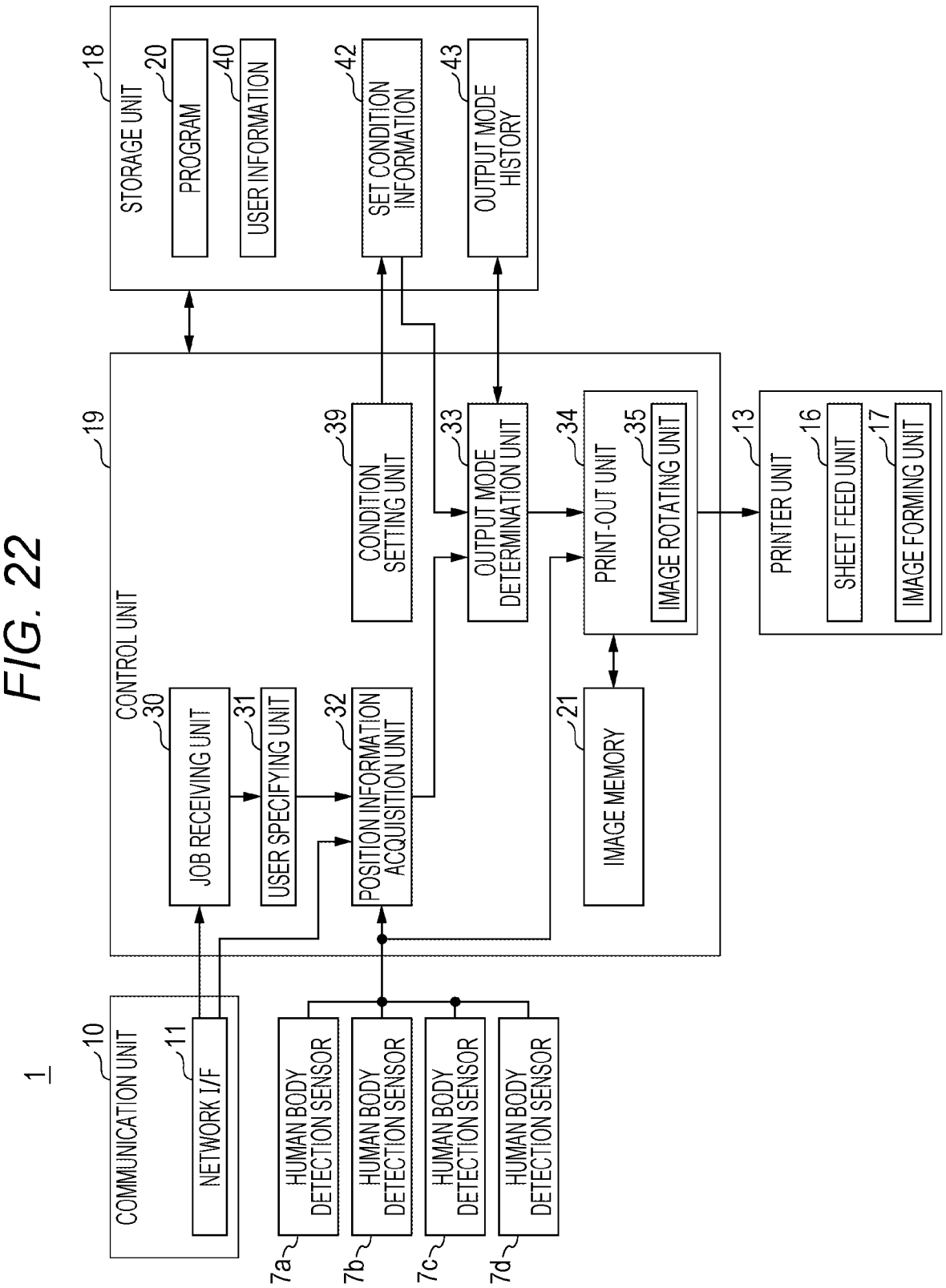
FIG. 22 is a diagram illustrating an example of hardware components and functional components of an image forming apparatus of a sixth embodiment.

FIG. 22 is a diagram illustrating an example of hardware components and functional components of an image forming apparatus 1 of this embodiment. The image forming apparatus 1 includes a plurality of human body detection sensors 7a to 7d, a communication unit 10, a printer unit 13, a storage unit 18, and a control unit 19.

The plurality of human body detection sensors 7a to 7d are the same as the sensors described in the fifth embodiment, and are sensors that are used to detect users present in an area AR5 within a predetermined range around the image forming apparatus 1.

Further, the storage unit 18 of this embodiment further stores set condition information 42 and output mode history 43 in addition to the information described in each embodiment. The set condition information 42 is setting information about predetermined conditions that are set on a condition setting unit 39 to be described below by user. The output mode history 43 is information where the history of the output mode of the past print job of each user is recorded.

Basically, the image forming apparatus 1 of this embodiment acquires position information corresponding to a position where a sensor detecting a user is installed in a case where the user is detected by any one sensor of the plurality of human body detection sensors 7a to 7d. For this reason, unless any one of the plurality of human body detection sensors 7a to 7d detects a user, the image forming apparatus 1 cannot acquire position information representing the position of the user and cannot determine the output mode of a printed matter. Accordingly, the image forming apparatus 1 of this embodiment is adapted to determine the output mode of the present print job on the basis of an output mode, which was used when a user inputting the print job output a printed matter in the past, without waiting until any one of the plurality of human body detection sensors 7a to 7d detects the user if conditions preset by the user are satisfied when the image forming apparatus 1 of this embodiment receives a print job. This will be described in detail below.

A CPU executes a program 20, so that the control unit 19 functions as a job receiving unit 30, a user specifying unit 31, a position information acquisition unit 32, an output mode determination unit 33, a print-out unit 34, and a condition setting unit 39.

Figure 23:
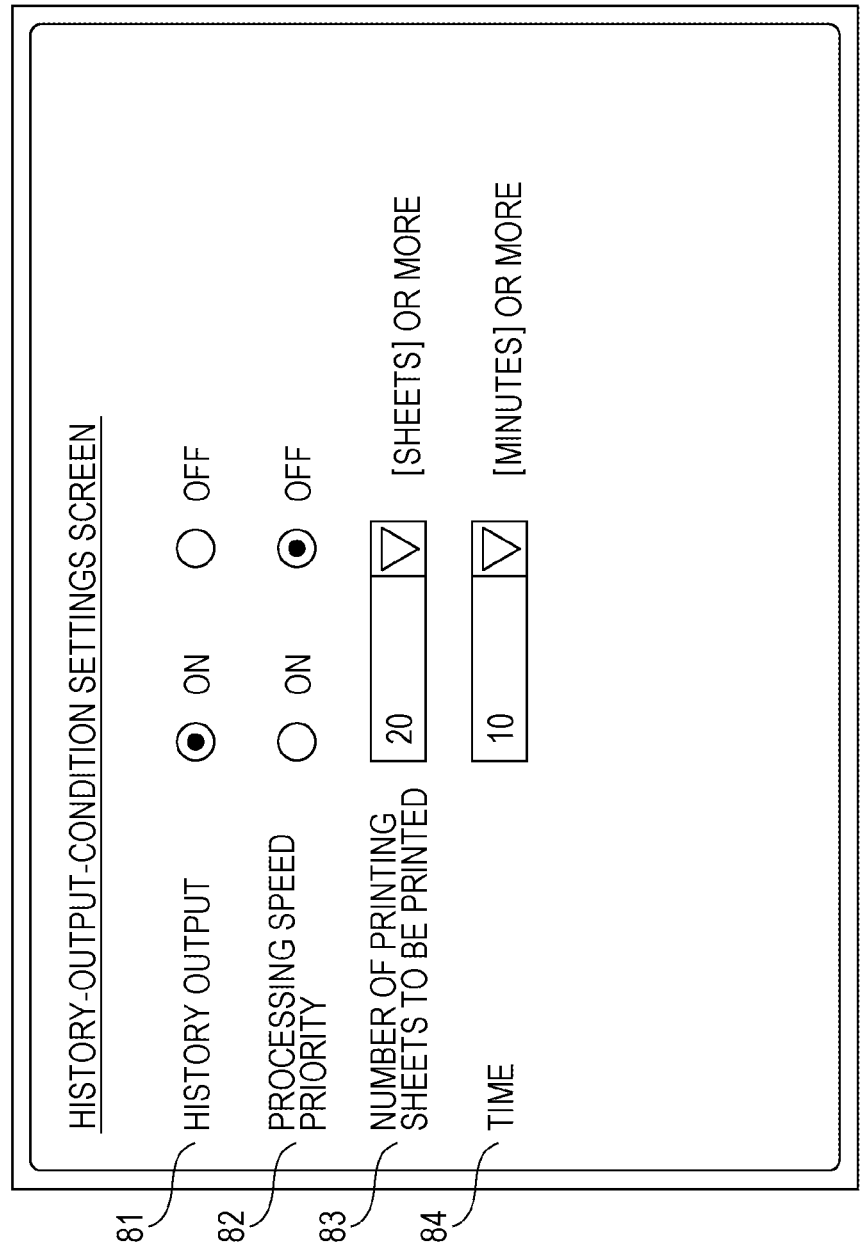
FIG. 23 is a diagram illustrating an example of a history-output-condition settings screen.

The condition setting unit 39 is a processing unit that sets conditions used to determine the output mode of the present print job on the basis of the history of the past output mode. The condition setting unit 39 sets conditions, which are used to determine the output mode of the present print job, on the basis of a user's setting operation and the history of the past output mode, and registers the conditions in the set condition information 42 for every user in advance. FIG. 23 is a diagram illustrating an example of a history-output-condition settings screen. For example, a user operates an information processing device, such as a personal computer (PC), connected to a network and has access to the image forming apparatus 1 to cause the information processing device to display the history-output-condition settings screen. Accordingly, a user can register one's own set condition information 42 in the image forming apparatus 1 by operating one's own information processing device. As illustrated in FIG. 23, the history-output-condition settings screen includes a plurality of setting items 81 to 84 that can be set by a user.

The first setting item 81 is an item that sets whether or not to output history. In a case where the first setting item 81 is set to OFF by a user, the output mode of a printed matter is not determined on the basis of the output mode history 43. In contrast, if any one of conditions set in the second to fourth setting items 82 to 84 is satisfied in a case where the first setting item 81 is set to ON by a user, the output mode of a printed matter is determined on the basis of the output mode history 43. A case where the first setting item 81 is set to ON will be described below.

The second setting item 82 is an item that sets whether or not to give priority to a processing speed. In a case where the second setting item 82 is set to ON by a user, the output mode of a printed matter is determined on the basis of the output mode history 43 every time. For example, in a case where it takes time to acquire position information for certain reason or a case where a print job starts to be executed after a user approaches the image forming apparatus 1, there is a possibility that the user may wait until the completion of the execution of the print job. If the second setting item is set to ON to avoid such a situation, the image forming apparatus 1 starts to execute a print job immediately after the reception of the print job whenever the image forming apparatus 1 receives the print job input by a user.

Accordingly, it is possible to reduce a possibility that the user may wait for the completion of the print job.

The third setting item 83 is an item that sets the number of printing sheets to be printed as a condition where the output mode of a printed matter is determined on the basis of the output mode history 43. For example, unless a print job is started immediately after the input of the print job in a case where the number of printing sheets to be printed designated in the print job is large, there is a possibility that a user may be caused to wait until the completion of the execution of the print job. Accordingly, if the number of printing sheets to be printed designated in the print job is equal to or larger than the number of printing sheets to be printed set in the third setting item 83 in a case where the number of printing sheets to be printed is set in the third setting item 83 as a condition, the output mode of a printed matter can be quickly determined on the basis of the output mode history 43. As a result, it is possible to reduce a possibility that a user may be cause to wait. A user can set a desired number of printing sheets in the third setting item 83.

The fourth setting item 84 is an item that sets the waiting time of a print job as a condition where the output mode of a printed matter is determined on the basis of the output mode history 43. For example, in a case where a user leaves a printed matter as it is without coming to acquire the printed matter after inputting a print job to the image forming apparatus 1, the print job remains in a suspended state in the image forming apparatus 1. For this reason, the print job occupies the storage area of the storage unit 18. A user can set the waiting time of the print job in the fourth setting item 84 to prevent the print job from occupying the storage area. For example, in a case where the waiting time is set to 10 minutes, the image forming apparatus 1 waits for the approach of a user until 10 minutes has passed after the reception of the print job and determines the output mode of a printed matter on the basis of the output mode history 43 and outputs the printed matter after 10 minutes has passed. The fourth setting item 84 is an item that is used to set such waiting time.

The condition setting unit 39 generates the set condition information 42 on the basis of a user's operation performed on the history-output-condition settings screen, and stores the set condition information 42 in the storage unit 18. That is, the set condition information 42 stored in the storage unit 18 is information that includes setting values selected for the plurality of setting items 81 to 84 having been described above by a user. Meanwhile, in a case where a user does not perform a setting operation on the history-output-condition settings screen, set condition information 42 in which default values are reflected for the plurality of setting items 81 to 84 is stored in the storage unit 18.

When the job receiving unit 30 receives a print job, the job receiving unit 30 stores the print job in the storage unit 18. When the print job is received by the job receiving unit 30, the user specifying unit 31 specifies a user inputting the print job. When the user specifying unit 31 specifies the user inputting the print job, the position information acquisition unit 32 and the output mode determination unit 33 are caused to function.

Until any one of the plurality of human body detection sensors 7a to 7d detects the user, the position information acquisition unit 32 waits. When the user is detected by any one of the plurality of human body detection sensors 7a to 7d, the position information acquisition unit 32 specifies the position of the user according to the installation position of the sensor detecting the user and generates position information. Then, the position information acquisition unit 32 outputs the position information to the output mode determination unit 33.

When the user inputting the print job is specified, the output mode determination unit 33 reads the set condition information 42 from the storage unit 18 and extracts the set condition information 42 preset by the user inputting the print job. Then, the output mode determination unit 33 specifies a determination method, which is used when the output mode of a printed matter is determined, on the basis of the set condition information 42 of the user inputting the print job. For example, in a case where the first setting item 81 is set to OFF, the output mode determination unit 33 waits until the output of the position information of the user from the position information acquisition unit 32 and determines the output mode of a printed matter on the basis of the position information after the output of the position information of the user.

Further, in a case where the first setting item 81 is set to ON, the output mode determination unit 33 determines the respective conditions set in the other setting items 82 to 84 and determines the output mode of a printed matter on the basis of these respective conditions. For example, in a case where the number of printing sheets to be printed is set to 100 or more in the third setting item 83, the output mode determination unit 33 determines whether or not the number of printing sheets to be printed designated in the print job is 100 or more. If the number of printing sheets to be printed designated in the print job is 100 or more, the output mode determination unit 33 reads the output mode history 43 from the storage unit 18 and determines the output mode of the present print job on the basis of the output mode of a printed matter, which was used when the user inputting the print job output a printed matter in the past. At this time, the output mode determination unit 33 may be adapted to employ an output mode of which the number of times is largest among a plurality of output modes that are recorded in the output mode history 43 or may be adapted to employ the previous output mode.

Figure 24:
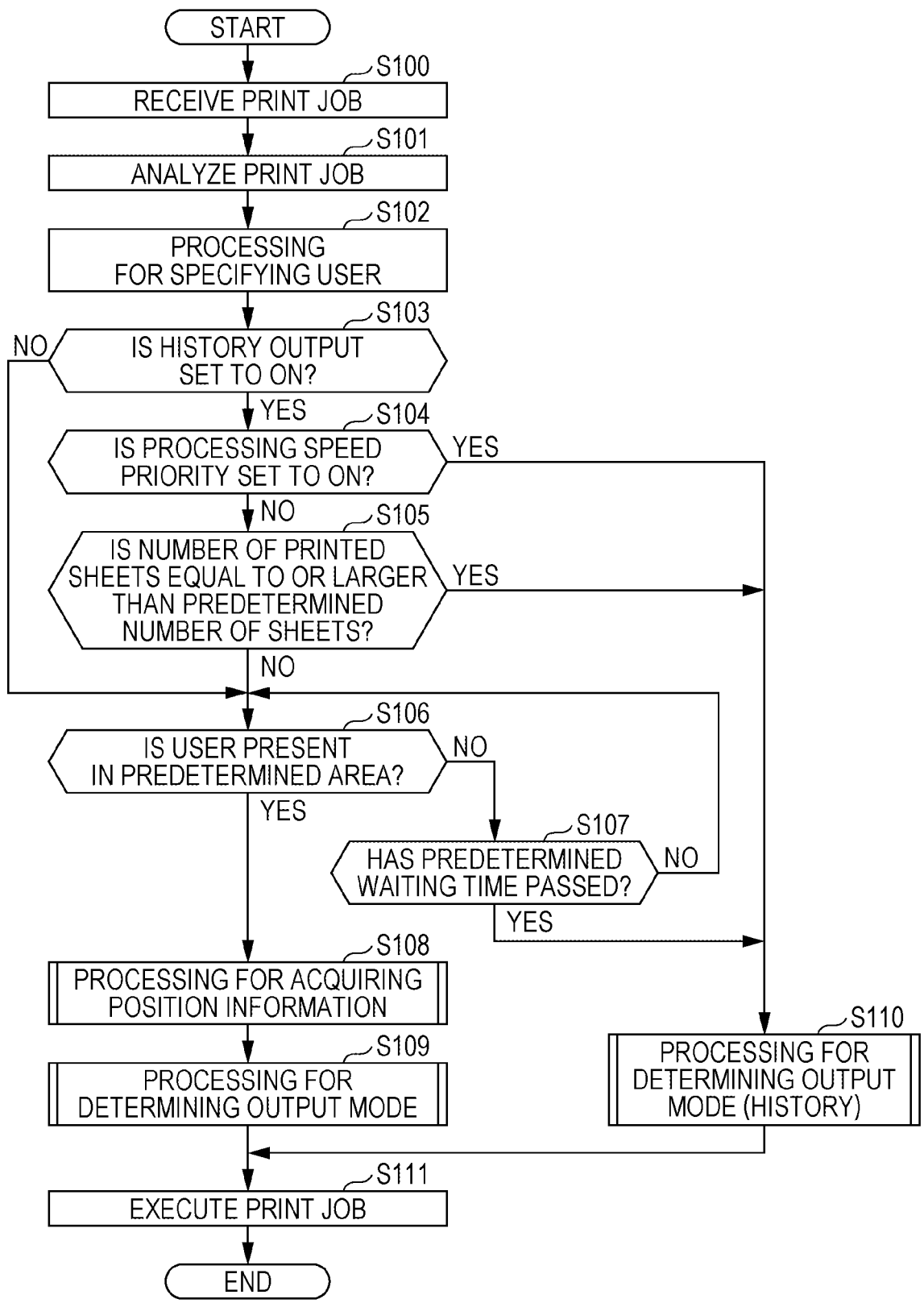
FIG. 24 is a flowchart illustrating an example of the procedure of processing performed in the image forming apparatus of the sixth embodiment.

Next, an example of the specific operation of the image forming apparatus 1 of this embodiment will be described. FIG. 24 is a flowchart illustrating an example of the procedure of processing performed in the image forming apparatus 1. This processing is processing that is started when the image forming apparatus 1 receives a print job. When the image forming apparatus 1 receives a print job (step S100), the image forming apparatus 1 performs analyzes the print job (step S101) and performs processing for specifying the user (step S102).

After that, the image forming apparatus 1 checks the set condition information 42 stored in the storage unit 18 and determines whether or not the first setting item 81 is set to ON (step S103). If the first setting item 81 is not set to ON (NO in step S103), the processing proceeds to step S106. On the other hand, if the first setting item 81 is set to ON (YES in step S103), the image forming apparatus 1 determines whether or not the second setting item 82 is set to ON (step S104). If the second setting item is set to ON (YES in step S104), the processing performed by the image forming apparatus 1 proceeds to step S110.

On the other hand, if the second setting item 82 is set to OFF (NO in step S104), the image forming apparatus 1 checks whether or not the number of printing sheets to be printed designated in the print job is equal to or larger than the number of printing sheets to be printed set in the third setting item 83 (step S105). If the number of printing sheets to be printed designated in the print job is equal to or larger than the number of printing sheets to be printed set in the third setting item 83 (YES in step S105), the processing performed by the image forming apparatus 1 proceeds to step S110.

Further, if the number of printing sheets to be printed designated in the print job is smaller than the number of printing sheets to be printed set in the third setting item 83 (NO in step S105), the image forming apparatus 1 checks whether or not the user is present in an area AR5 within the range of a predetermined distance around the image forming apparatus 1 (step S106). If the user is not present in the area AR5 (NO in step S106), the image forming apparatus 1 checks whether or not a waiting time set in the fourth setting item 84 has passed after the print job is received by the job receiving unit 30 (step S107). If the waiting time set in the fourth setting item 84 has passed after the print job is received by the job receiving unit 30 (YES in step S107), the processing performed by the image forming apparatus 1 proceeds to step S110. Further, if the waiting time set in the fourth setting item 84 has not passed after the print job is received (NO in step S107), the processing performed by the image forming apparatus 1 returns to step S106 and the above-mentioned processing is repeated.

If it is detected in step S106 that the user is present in the area AR5 (YES in step S106), the image forming apparatus 1 causes the position information acquisition unit 32 to function to perform processing for acquiring position information (step S108). For example, the detail of the processing for acquiring position information (step S108) is the same as that of the processing for acquiring position information (step S94) illustrated in FIG. 21B. After that, the image forming apparatus 1 causes the output mode determination unit 33 to function to perform processing for determining an output mode (step S109). For example, the detail of the processing for determining the output mode (step S109) is the same as that of the processing for determining the output mode (step S5) illustrated in FIG. 5C.

Figure 25:
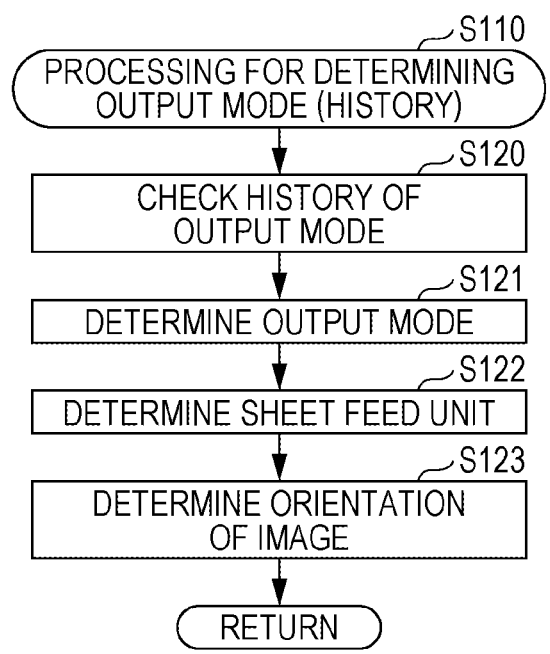
FIG. 25 is a flowchart illustrating an example of the procedure of processing performed in the image forming apparatus of the sixth embodiment.

Next, processing for determining an output mode of step S110 will be described. FIG. 25 is a flowchart illustrating an example of the detailed procedure of the processing for determining the output mode (step S110) performed by the output mode determination unit 33. When the output mode determination unit 33 starts the processing for determining the output mode, the output mode determination unit 33 reads the output mode history 43 from the storage unit 18 and checks the history of the past output mode of the user inputting the print job (step S120). Then, the output mode determination unit 33 determines an output mode, which is to be used when the present print job is executed, according to the past output mode recorded in the output mode history 43 (step S121). That is, the output mode determination unit 33 is to determine any one output mode of the first to fourth output modes as the output mode of a printed matter of the present print job. Then, the output mode determination unit 33 determines one sheet feed unit 16, which is to feed printing sheets, among the plurality of sheet feed units 16 on the basis of the determined output mode (step S122). In addition, the output mode determination unit 33 determines the rotation angle of an image, which is to be used when an image is formed, on the basis of the determined output mode (step S123). At this time, any one of 0°, 90°, 180°, and 270° is determined as the rotation angle of the image according to the output mode of a printed matter. The processing for determining the output mode (step S111) ends with this.

Returning to FIG. 24, when an output mode is determined by the output mode determination unit 33, the image forming apparatus 1 causes the print-out unit 34 to function to execute the print job (step S111). The image forming apparatus 1 outputs a printed matter of the output mode determined by the output mode determination unit 33. The image forming apparatus 1 ends the processing associated with the reception of the print job when the execution of the print job is completed.

As described above, conditions, which are required to determine the output mode of a printed matter on the basis of the past output mode of the user, are preset in the image forming apparatus 1 of this embodiment. When the image forming apparatus 1 receives a print job, the image forming apparatus 1 determines whether or not the preset conditions are satisfied. Then, if the image forming apparatus 1 determines that the preset conditions are satisfied, the image forming apparatus 1 determines the output mode of a printed matter of the present print job on the basis of the output mode of a printed matter, which was used when the user inputting the print job output a printed matter in the past. According to this image forming apparatus 1, a print job can be quickly executed under a condition where it is desired that the print job quickly starts.

Meanwhile, this embodiment is the same as the first to fifth embodiments except for the point described above in this embodiment. For this reason, the image forming apparatus 1 of this embodiment has the same effects as those of the first to fifth embodiments.

Seventh Embodiment

Next, a seventh embodiment of the present disclosure will be described. One aspect where a plurality of users including a user inputting a print job are specified and the output modes of printed matters are determined for the plurality of users in a case where an instruction for printing a plurality of printing sheets is included in a print job, which is input by a user, as the number of printing sheets to be printed will be described in this embodiment.

Figure 26:
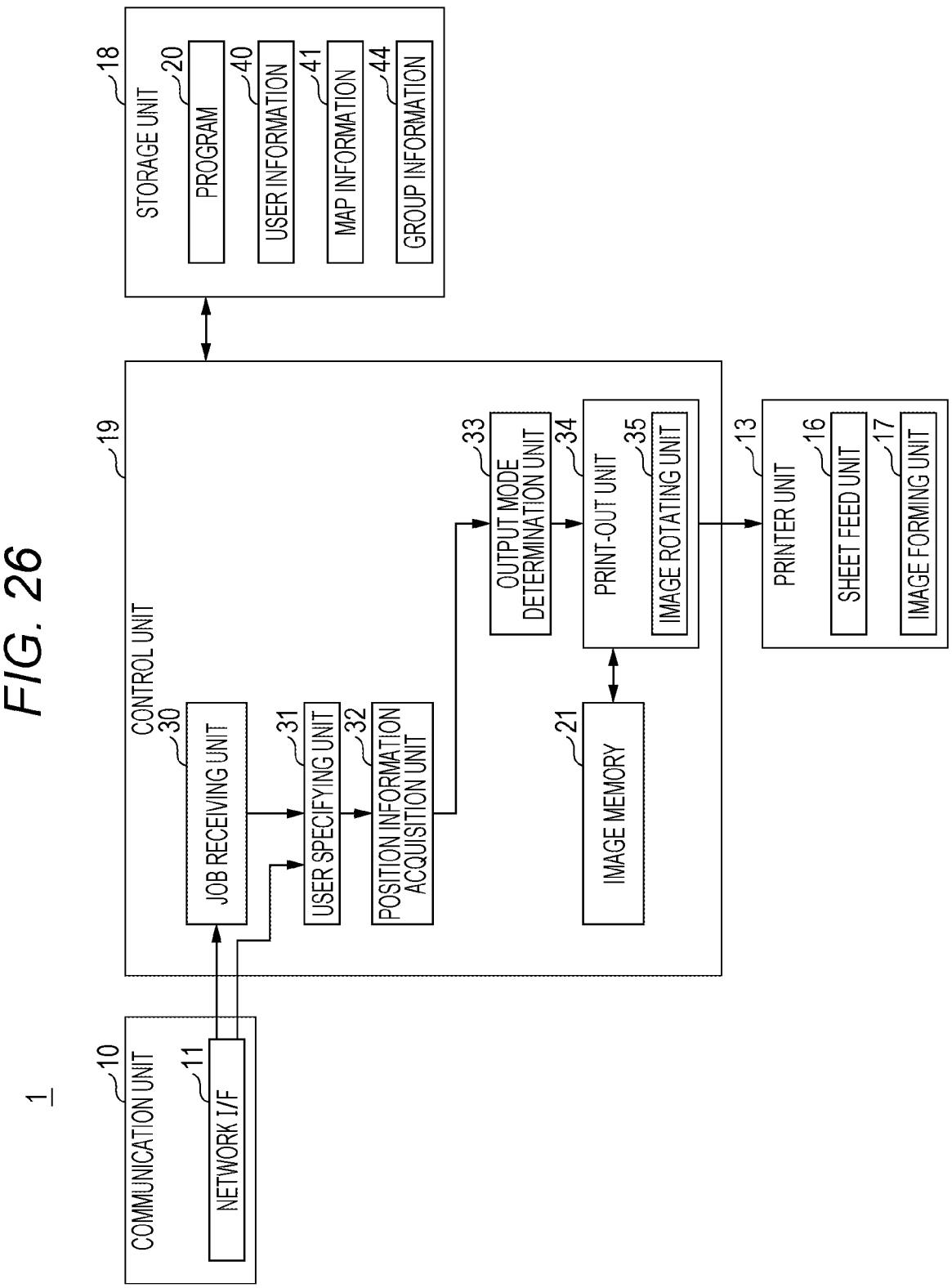
FIG. 26 is a diagram illustrating an example of hardware components and functional components of an image forming apparatus of a seventh embodiment.

FIG. 26 is a diagram illustrating an example of hardware components and functional components of an image forming apparatus 1 of this embodiment. The image forming apparatus 1 illustrated in FIG. 26 is different from each of the above-mentioned embodiments in that group information 44 is stored in a storage unit 18. The group information 44 is information where a plurality of users permitted to enter an office or the like are registered for each group.

Figures 27, 28:
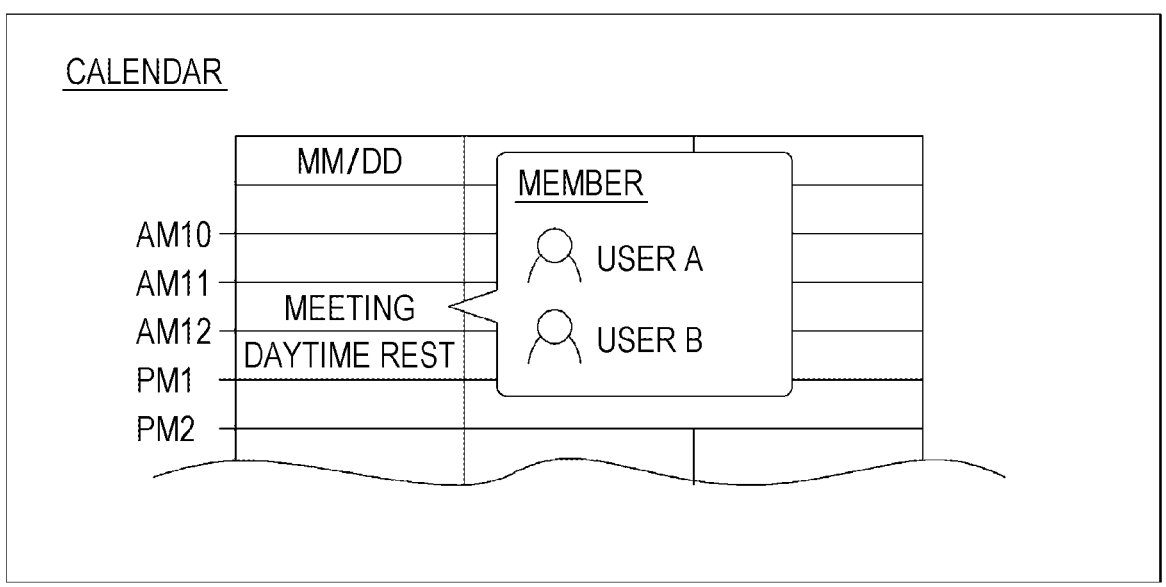
FIG. 27 is a diagram illustrating an example of group information.
FIG. 28 is a diagram illustrating an example of a method of specifying a user.

FIG. 27 is a diagram illustrating an example of the group information 44. As illustrated in FIG. 27, the group information 44 is information where groups are associated with users. In the example illustrated in FIG. 27, two groups formed of a group G1 and a group G2 are registered in the group information 44 and all users belonging to each of the groups G1 and G2 are associated with the groups G1 and G2.

In a case where a print job input by a user is a print job for giving an instruction of the printing of a plurality of printing sheets, a user specifying unit 31 specifies a plurality of users including the user inputting the print job and other users who have a certain relationship with the user inputting the print job. That is, in a case where a user inputs a print job, which gives an instruction of the printing of a plurality of printing sheets, to the image forming apparatus 1, generally, some of the plurality of printing sheets are printed matters for the user inputting the print job and the rest of the plurality of printing sheets are printed matters for the other users. In this case, the user inputting the print job moves to the installation location of the image forming apparatus 1 and acquires only one's own printed matters, and the other users also move to the installation location of the image forming apparatus 1 and acquire only one's own printed matters. For this reason, the user specifying unit 31 is to suppose a case where the plurality of users moves to the installation location of the image forming apparatus 1 to individually acquire printed matters, and is to specify the plurality of users. At this time, the user specifying unit 31 refers to the group information 44 and specifies the other users, who have a certain relationship with the user inputting the print job, on the basis of the group information 44.

For example, a case where a print job for giving an instruction of the printing of three printing sheets is input by a user A will be assumed. In this case, the user specifying unit 31 specifies the user A who inputs the job first. After that, since the number of printing sheets to be printed is three, the user specifying unit 31 specifies that all users as object to which printed matters are to be distributed are three persons. Then, the user specifying unit 31 refers to the group information 44, and determines whether or not a group of which the number of users is 3 is present in the groups to which the user A belongs. For example, referring to the group information 44 illustrated in FIG. 27, the user A belongs to two groups G1 and G2 and it is ascertained that the number of users of the group G2 of the two groups is three. For this reason, the user specifying unit 31 specifies a user M and a user N, who are members belonging to the group G2 other than the user A, as the other users who have a certain relationship with the user A. Then, the user specifying unit 31 outputs information about the plurality of specified users to a position information acquisition unit 32.

A case where the user specifying unit 31 specifies the plurality of users on the basis of the group information 44 has been exemplified above, but a method of specifying the plurality of users is not limited thereto. For example, in a case where schedule information of each of the plurality of users is stored in a server, the user specifying unit 31 may be adapted to have access to the server, to refer to the schedule information of the user inputting the print job, and to specify other users, who have a certain relationship with the user inputting the print job, on the basis of the schedule information. FIG. 28 is a diagram illustrating an example of the schedule information of the user inputting the print job that is stored in the server. The user specifying unit 31 refers to the schedule information of the user inputting the print job, and checks the schedules of the users in a time zone before and after the print job is input. Then, the user specifying unit 31 specifies the other users who attend the same meeting as the user inputting the job. Since the plurality of users are specified on the basis of the schedule information in this way, other users not belonging to the determined group can also be specified.

The position information acquisition unit 32 acquires the position information of the plurality of users who are specified by the user specifying unit 31. The position information acquisition unit 32 outputs the acquired position information of the plurality of users to an output mode determination unit 33.

Figure 29:
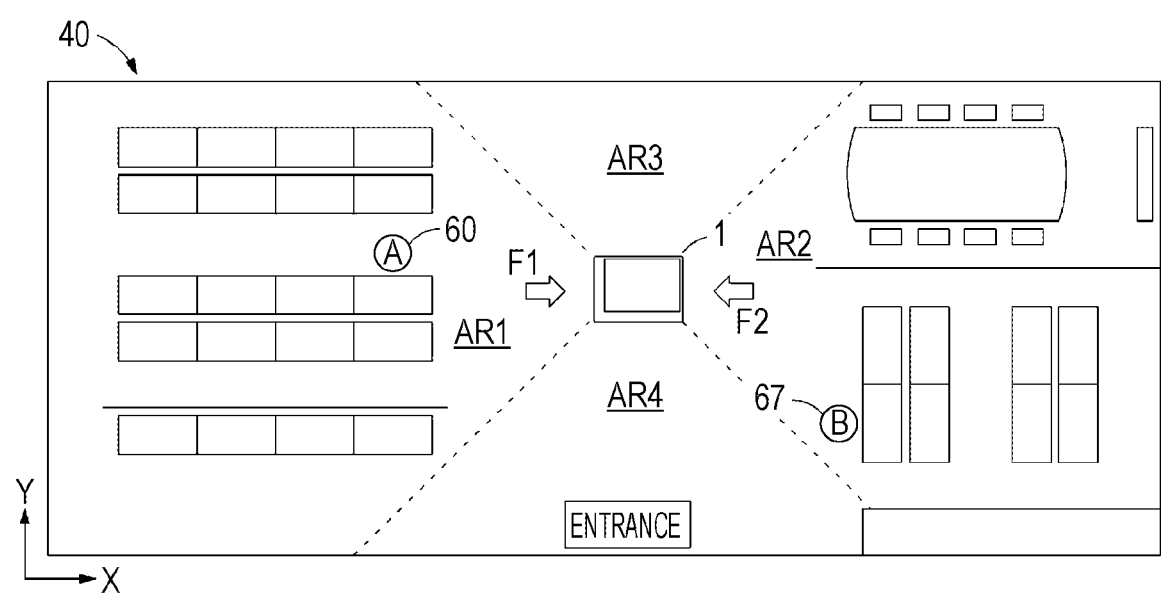
FIG. 29 is a diagram illustrating an example of the output mode of a printed matter that is determined by an output mode determination unit of the seventh embodiment.

The output mode determination unit 33 determines the output mode of a printed matter of each user on the basis of the position information of each user acquired by the position information acquisition unit 32. FIG. 29 is a diagram illustrating an example of the output mode of a printed matter that is determined by the output mode determination unit 33. As illustrated in FIG. 29, position information, which represents the position 60 of the user A and the position 67 of a user B, is acquired by the position information acquisition unit 32. In this case, the position 60 of the user A is included in an area AR1. For this reason, the output mode determination unit 33 predicts that the user A will approach in the direction of an arrow F1. Then, the output mode determination unit 33 determines a first output mode so that the front of a printed matter faces the user A approaching in the direction of the arrow F1. Meanwhile, the position 67 of the user B is included in an area AR2. For this reason, the output mode determination unit 33 predicts that the user B will approach in the direction of an arrow F2. Then, the output mode determination unit 33 determines a second output mode so that the front of a printed matter faces the user B approaching in the direction of the arrow F2.

A print-out unit 34 outputs a plurality of printed matters on the basis of the output modes that are determined for the plurality of users. For this reason, even in a case where the plurality of users, who are specified by the user specifying unit 31, individually come to acquire printed matters, each user can acquire a printed matter from the front.

Figure 30:
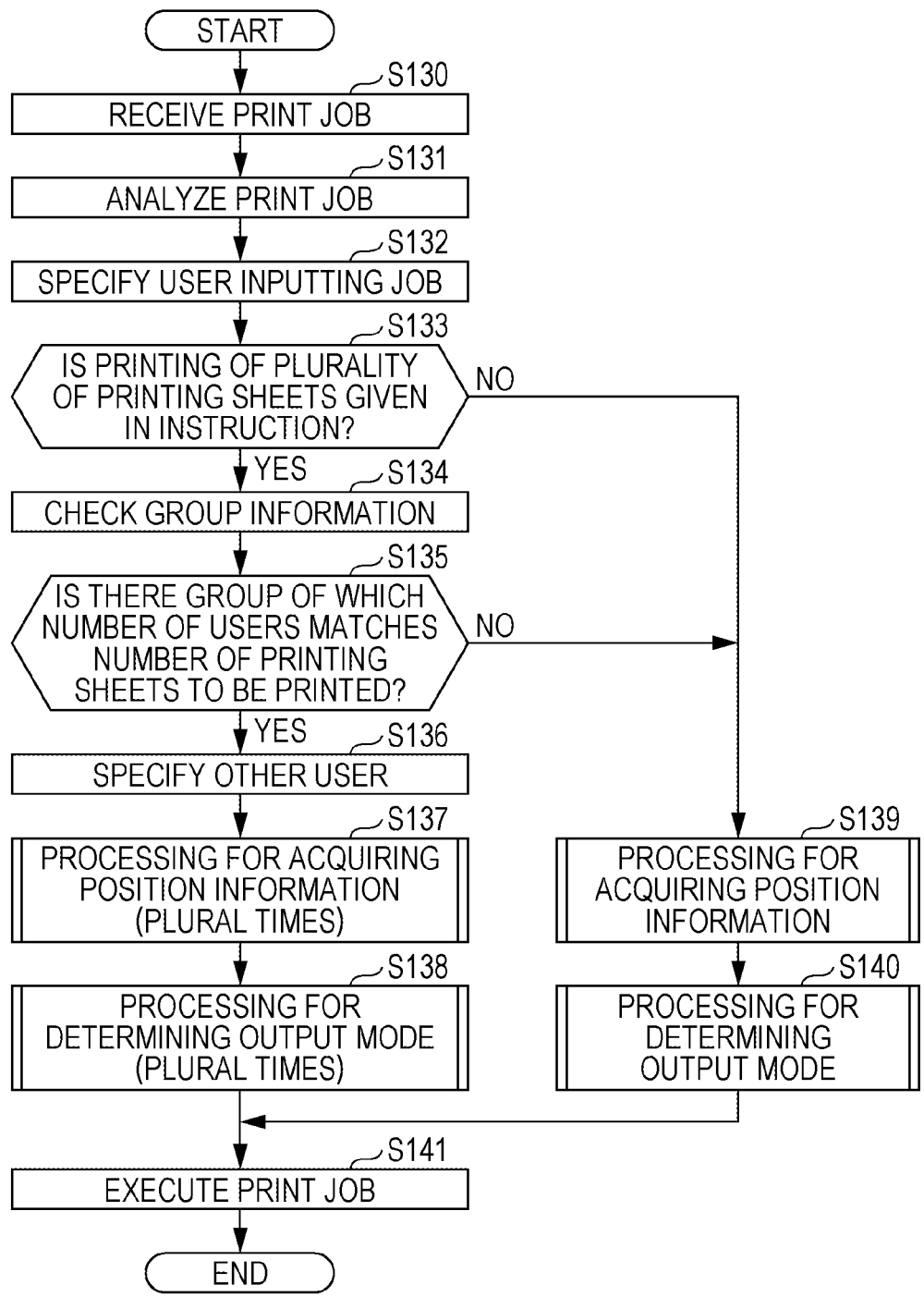
FIG. 30 is a flowchart illustrating an example of the procedure of processing performed in the image forming apparatus of the seventh embodiment.

Next, an example of the specific operation of the image forming apparatus 1 of this embodiment will be described. FIG. 30 is a flowchart illustrating an example of the procedure of processing performed in the image forming apparatus 1. This processing is processing that is started when the image forming apparatus 1 receives a print job. When the image forming apparatus 1 receives a print job (step S130), the image forming apparatus 1 analyzes the print job (step S131) and specifies a user inputting the print job (step S132).

After that, the image forming apparatus 1 analyzes the print job and determines whether or not the print job is a print job for giving an instruction of the printing of a plurality of printing sheets (step S133). If the print job is a print job for giving the instruction the printing of a plurality of printing sheets (YES in step S133), the image forming apparatus 1 causes the user specifying unit 31 to function to check the group information 44 (step S134).

As the result of the check of the group information 44, if there is a group of which the number of users is equal to the number of printing sheets to be printed among groups to which the user inputting the print job belongs (YES in step S135), the user specifying unit 31 specifies other users belonging to the group (step S136). After that, the image forming apparatus 1 performs processing for acquiring position information (plural times) (step S137) and performs processing for determining the output mode (plural times) subsequently to the processing for acquiring position information (plural times) (step S138). In detail, the processing for acquiring position information (step S137) is processing for performing the same processing as the processing for acquiring position information (step S4) of FIG. 5B described in the first embodiment for each user. In detail, the processing for determining the output mode (step S138) is processing for performing the same processing as the processing for determining the output mode (step S5) of FIG. 5C described in the first embodiment for each user.

In contrast, if the print job is not a print job for giving the instruction of the printing of a plurality of printing sheets (NO in step S133) or if there is no group of which the number of users is equal to the number of printing sheets to be printed (NO in step S135), the image forming apparatus 1 performs processing for acquiring position information (step S139) and performs processing for determining the output mode subsequently to the processing for acquiring position information (step S140). The detail of the processing for acquiring position information (step S139) is the same as that of the processing for acquiring position information (step S4) of FIG. 5B described in the first embodiment. Further, the detail of the processing for determining the output mode (step S140) is the same as that of the processing for determining the output mode (step S5) of FIG. 5C described in the first embodiment.

When the output modes are determined by the output mode determination unit 33, the image forming apparatus 1 causes the print-out unit 34 to function to execute the print job (step S141). That is, in a case where the print-out unit 34 performs the printing of a plurality of printing sheets, the print-out unit 34 outputs printed matters so that the output mode of each printed matter becomes the output mode determined for each user. Further, in a case where the print-out unit 34 does not perform the printing of a plurality of printing sheets and performs the printing of only one printing sheet, the print-out unit 34 outputs printed matters so that the output mode of the printed matter becomes the output mode determined for the user inputting the print job. The image forming apparatus 1 ends the processing associated with the reception of the print job when the execution of the print job is completed.

In a case where the print job input by the user is a print job for giving an instruction of the printing of a plurality of printing sheets, as described above, the image forming apparatus 1 of this embodiment can specify a plurality of users including not only the user inputting the job but also other users having a certain relationship with the user inputting the job, determine the output mode of a printed matter for each of the plurality of users, and output a plurality of printed matters.

Meanwhile, this embodiment is the same as the first to sixth embodiments except for the point described above in this embodiment. For this reason, the image forming apparatus 1 of this embodiment has the same effects as those of the first to sixth embodiments.

(Modifications)

Several embodiments of the present disclosure have been described above. However, the present disclosure is not limited to the contents described in the respective embodiments, and various modifications can be applied.

For example, the configuration and operation described in each of the first to seventh embodiments can also be applied to the other embodiments.

Further, an apparatus having only a printer function has been described in the embodiments as the image forming apparatus 1 by way of example. However, the present disclosure is not limited thereto, and may be applied to an apparatus having at least a printer function. For example, MFP having a scan function and a copy function in addition to a printer function is also included in the image forming apparatus of the present disclosure.

A case where the program 20 is installed in the image forming apparatus 1 in advance has been exemplified in the embodiments. However, the program 20 is not limited to a case where the program 20 is installed in the image forming apparatus 1 in advance, and may be an object to be dealt alone. In this case, the program 20 may be provided to the image forming apparatus 1 in the form to be downloaded by a user through the Internet, and may be provided to the image forming apparatus 1 in a state where the program 20 is recorded in a computer-readable recording medium, such as CD-ROM or flash.

Although embodiments of the present disclosure have been described and illustrated in detail, the disclosed embodiments are made for purposes of illustration and example only and not limitation. The scope of the present disclosure should be interpreted by terms of the appended claims.

As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. An image forming apparatus, comprising:
a hardware processor that:
receives a print job;
acquires position information of a user;
determines an output mode of a printed matter on the basis of the acquired position information;
selects an orientation of an image to be formed on a printing sheet according to the determined output mode of the printed matter;
executes the print job in the determined output mode; and
outputs the printed matter in the determined output mode.

2. The image forming apparatus according to claim 1, further comprising:
a plurality of sheet feed trays in which printing sheets are set in different directions,
wherein the hardware processor selects one sheet feed tray from among the plurality of sheet feed trays according to the determined output mode of the printed matter and feeds the printing sheets.

3. The image forming apparatus according to claim 1, wherein the hardware processor acquires the position information of the user on the basis of position information of a terminal possessed by the user.

4. The image forming apparatus according to claim 1, wherein:
the hardware processor acquires an image of an area around the image forming apparatus, and
the hardware processor acquires the position information of the user on the basis of the acquired image.

5. The image forming apparatus according to claim 1, wherein:
the hardware processor detects a movement direction of the user on the basis of a change in the acquired position information of the user, and
the hardware processor determines the output mode of the printed matter on the basis of the detected movement direction of the user.

6. The image forming apparatus according to claim 1, further comprising:
a first storage that stores the print job; and
a detector that detects whether or not the user is present in a predetermined area around the image forming apparatus,
wherein the hardware processor starts to execute the print job in a case where the detector detects that the user is present in the predetermined area.

7. The image forming apparatus according to claim 1, wherein the hardware processor starts to execute the print job as the output mode of the printed matter is determined.

8. The image forming apparatus according to claim 1, further comprising:
a second storage that stores history of the determined output mode of the printed matter,
wherein the hardware processor determines the output mode of the printed matter on the basis of the history of the output mode of the printed matter stored in the second storage without determining the output mode of the printed matter on the basis of the position information of the user under a predetermined condition.

9. The image forming apparatus according to claim 8, wherein:
the hardware processor sets whether or not to give priority to a processing speed, and
the predetermined condition is a condition where a setting of the hardware processor gives priority to a processing speed.

10. The image forming apparatus according to claim 8, wherein the predetermined condition is a condition where a number of printing sheets to be printed designated in the print job is equal to or larger than a predetermined value.

11. The image forming apparatus according to claim 8, wherein the predetermined condition is a condition where the print job is not executed when a predetermined amount of time has passed after the print job is received by the hardware processor.

12. The image forming apparatus according to claim 8, wherein the second storage stores the history of the output mode of the printed matter, which is determined by the hardware processor, for each user.

13. The image forming apparatus according to claim 1, wherein:
the hardware processor specifies a user inputting the print job, and
the hardware processor acquires position information of the specified user.

14. The image forming apparatus according to claim 13, wherein the hardware processor:
specifies a plurality of users including the user inputting the print job and other users who have a certain relationship with the user;
acquires the position information of the specified plurality of users;
determines the output mode of the printed matter for each user on the basis of the acquired position information of each of the plurality of users; and
outputs each of a plurality of printed matters on the basis of the output modes that are determined with respect to the each user.

15. The image forming apparatus according to claim 1, wherein the hardware processor outputs the printed matter in the selected orientation during the print job.

16. A non-transitory recording medium storing a computer readable program causing an image forming apparatus to perform:
receiving a print job;
acquiring position information of a user;
determining an output mode of a printed matter on the basis of the acquired position information;
selecting an orientation of an image to be formed on a printing sheet according to the determined output mode of the printed matter;
executing the print job in the determined output mode; and
outputting the printed matter in the determined output mode.

17. The medium of claim 16, wherein the printed matter is outputted in the selected orientation during the print job.

* * * * *